(12) United States Patent
Blum et al.

(10) Patent No.: US 7,883,206 B2
(45) Date of Patent: Feb. 8, 2011

(54) MULTIFOCAL LENS HAVING A PROGRESSIVE OPTICAL POWER REGION AND A DISCONTINUITY

(75) Inventors: Ronald D. Blum, Roanoke, VA (US);
William Kokonaski, Gig Harbor, WA (US); Venkatramani S. Iyer, Roanoke, VA (US); Joshua N. Haddock, Roanoke, VA (US); Mark Mattison-Shupnick, Petaluma, CA (US)

(73) Assignee: PixelOptics, Inc., Roanoke, VA (US)

( * ) Notice: Subject to any disclaimer, the term of this patent is extended or adjusted under 35 U.S.C. 154(b) by 466 days.

(21) Appl. No.: 11/964,030

(22) Filed: Dec. 25, 2007

(65) Prior Publication Data

US 2008/0218689 A1    Sep. 11, 2008

Related U.S. Application Data

(60) Provisional application No. 60/905,304, filed on Mar. 7, 2007, provisional application No. 60/907,097, filed on Mar. 21, 2007, provisional application No. 60/935,226, filed on Aug. 1, 2007, provisional application No. 60/935,492, filed on Aug. 16, 2007, provisional application No. 60/935,573, filed on Aug. 20, 2007, provisional application No. 60/956,813, filed on Aug. 20, 2007, provisional application No. 60/970,024, filed on Sep. 5, 2007.

(51) Int. Cl.
*G02C 7/06* (2006.01)
(52) U.S. Cl. .................... 351/169; 351/171
(58) Field of Classification Search .......... 351/169, 351/171
See application file for complete search history.

(56) References Cited

U.S. PATENT DOCUMENTS 2,437,642 A    3/1948    Henroleau

| | | |
|---|---|---|
| 2,576,581 A | 11/1951 | Edwards |
| 3,161,718 A | 12/1964 | De Luca |
| 3,245,315 A | 4/1966 | Marks et al. |
| 3,248,460 A | 4/1966 | Naujokas |

(Continued)

FOREIGN PATENT DOCUMENTS

| | | |
|---|---|---|
| DE | 4223395 | 1/1994 |
| EP | 0154962 A2 | 9/1985 |
| EP | 0233104 A1 | 8/1987 |
| EP | 0237365 A1 | 9/1987 |
| EP | 0 578 833 A1 | 1/1994 |

(Continued)

OTHER PUBLICATIONS

International Search Report for international Application No. PCT/US07/88790, dated May 24, 2008.

(Continued)

*Primary Examiner*—Jordan M. Schwartz
(74) *Attorney, Agent, or Firm*—Townsend and Townsend and Crew LLP

(57) ABSTRACT

Embodiments of the present invention relate to a multifocal lens having a mostly spherical power region and a progressive optical power region. Embodiments of the present invention provide for the proper alignment and positioning of each of these regions, the amount of optical power provided by each of the regions, the optical design of the progressive optical power region, and the size and shape of each of the regions. The combination of these design parameters allows for an optical design having less unwanted astigmatism and distortion as well as both a wider channel width and a shorter channel length compared to conventional PALs. Embodiments of the present invention may also provide a new, inventive far-intermediate distance zone and may further provide for increased vertical stability of vision within a zone of the lens.

89 Claims, 19 Drawing Sheets

U.S. PATENT DOCUMENTS

| | | |
|---|---|---|
| 3,309,162 A | 3/1967 | Kosanke of al |
| 3,614,215 A | 10/1971 | Mackta |
| 3,738,734 A | 6/1973 | Tait et al. |
| 3,791,719 A | 2/1974 | Kratzer et al. |
| 4,062,629 A | 12/1977 | Winthrop |
| 4,174,156 A | 11/1979 | Glorieux |
| 4,181,408 A | 1/1980 | Senders |
| 4,190,330 A | 2/1980 | Berreman |
| 4,190,621 A | 2/1980 | Greshes |
| 4,264,154 A | 4/1981 | Petersen |
| 4,279,474 A | 7/1981 | Belgorod |
| 4,300,818 A | 11/1981 | Schachar |
| 4,320,939 A | 3/1982 | Mueller |
| 4,373,218 A | 2/1983 | Schachar |
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,461,550 A | 7/1984 | Legendre |
| 4,461,629 A | 7/1984 | Arisaki |
| 4,466,703 A | 8/1984 | Nishimoto |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,787,903 A | 11/1988 | Grendahl |
| 4,795,248 A | 1/1989 | Okada et al. |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,869,588 A | 9/1989 | Frieder et al. |
| 4,873,029 A | 10/1989 | Blum |
| 4,880,300 A | 11/1989 | Payner et al. |
| 4,890,903 A | 1/1990 | Treisman et al. |
| 4,904,063 A | 2/1990 | Okada et al. |
| 4,907,860 A | 3/1990 | Noble |
| 4,909,626 A | 3/1990 | Purvis et al. |
| 4,919,520 A | 4/1990 | Okada et al. |
| 4,921,728 A | 5/1990 | Takiguchi |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,048 A | 8/1990 | Frieder et al. |
| 4,952,788 A | 8/1990 | Berger et al. |
| 4,955,712 A | 9/1990 | Barth et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,147,585 A | 9/1992 | Blum |
| 5,150,234 A | 9/1992 | Takahashi et al. |
| 5,171,266 A | 12/1992 | Wiley et al. |
| 5,178,800 A | 1/1993 | Blum |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,219,497 A | 6/1993 | Blum |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,488,439 A | 1/1996 | Weltmann |
| 5,512,371 A | 4/1996 | Gupta et al. |
| 5,522,323 A | 6/1996 | Richard |
| 5,552,841 A | 9/1996 | Gallorini et al. |
| 5,608,567 A | 3/1997 | Grupp |
| 5,615,588 A | 4/1997 | Gottschald |
| 5,654,786 A | 8/1997 | Bylander |
| 5,668,620 A | 9/1997 | Kurtin et al. |
| 5,682,223 A | 10/1997 | Menezes et al. |
| 5,683,457 A | 11/1997 | Gupta et al. |
| RE35,691 E | 12/1997 | Theirl et al. |
| 5,702,819 A | 12/1997 | Gupta et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,859,685 A | 1/1999 | Gupta et al. |
| 5,861,934 A | 1/1999 | Blum et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,019,470 A | 2/2000 | Mukaiyama et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |
| 6,095,651 A | 8/2000 | Williams et al. |
| 6,099,117 A | 8/2000 | Gregory |
| 6,106,118 A | 8/2000 | Menezes et al. |
| 6,115,177 A | 9/2000 | Vossler |
| 6,139,148 A | 10/2000 | Menezes |
| 6,145,987 A | 11/2000 | Baude et al. |
| 6,188,525 B1 | 2/2001 | Silver |

| | | |
|---|---|---|
| 6,191,881 B1 | 2/2001 | Tajima |
| 6,199,984 B1 | 3/2001 | Menezes |
| 6,213,602 B1 | 4/2001 | Smarto |
| 6,221,105 B1* | 4/2001 | Portney ............... 623/5.11 |
| 6,231,184 B1 | 5/2001 | Menezes et al. |
| 6,270,220 B1 | 8/2001 | Keren |
| 6,271,915 B1 | 8/2001 | Frey et al. |
| 6,305,802 B1 | 10/2001 | Roffman et al. |
| 6,322,215 B1* | 11/2001 | Bristol ................ 351/171 |
| 6,325,508 B1 | 12/2001 | Decreton et al. |
| 6,325,510 B1 | 12/2001 | Golub et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,652,096 B1 | 11/2003 | Morris et al. |
| 6,682,195 B2 | 1/2004 | Dreher |
| 6,709,105 B2 | 3/2004 | Menezes |
| 6,709,107 B2 | 3/2004 | Jiang et al. |
| 6,709,108 B2 | 3/2004 | Levine et al. |
| 6,738,199 B2 | 5/2004 | Nishioka |
| 6,768,536 B2 | 7/2004 | Okuwaki et al. |
| 6,774,871 B2 | 8/2004 | Birdwell |
| 6,778,246 B2 | 8/2004 | Sun et al. |
| 6,793,340 B1 | 9/2004 | Morris et al. |
| 6,833,938 B2 | 12/2004 | Nishioka |
| 6,840,619 B2 | 1/2005 | Dreher |
| 6,851,805 B2 | 2/2005 | Blum et al. |
| 6,859,333 B1 | 2/2005 | Ren et al. |
| 6,883,916 B2 | 4/2005 | Menezes |
| 6,886,938 B1 | 5/2005 | Menezes |
| 6,893,124 B1 | 5/2005 | Kurtin |
| 6,902,271 B2 | 6/2005 | Perrott et al. |
| 6,918,670 B2 | 7/2005 | Blum et al. |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,085,065 B2 | 8/2006 | Silver |
| 7,133,172 B2 | 11/2006 | Nishioka |
| 7,159,981 B2 | 1/2007 | Kato |
| 7,159,983 B2 | 1/2007 | Menezes et al. |
| 7,209,097 B2 | 4/2007 | Suyama |
| 7,229,173 B2 | 6/2007 | Menezes et al. |
| 7,234,811 B1 | 6/2007 | Tran |
| 7,258,437 B2 | 8/2007 | King et al. |
| 7,429,105 B2 | 9/2008 | Kumar et al. |
| 7,452,611 B2 | 11/2008 | Blackburn et al. |
| 7,465,414 B2 | 12/2008 | Knox et al. |
| 7,472,993 B2 | 1/2009 | Matsui |
| 2001/0055094 A1 | 12/2001 | Zhang |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai |
| 2003/0210377 A1 | 11/2003 | Blum et al. |
| 2004/0008319 A1 | 1/2004 | Lai et al. |
| 2004/0008320 A1* | 1/2004 | Shirayanagi ............... 351/168 |
| 2004/0051846 A1 | 3/2004 | Blum et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0233384 A1* | 11/2004 | Gupta et al. ............... 351/168 |
| 2004/0246440 A1 | 12/2004 | Andino et al. |
| 2005/0068494 A1 | 3/2005 | Griffin |
| 2005/0073739 A1 | 4/2005 | Meredith |
| 2005/0124983 A1 | 6/2005 | Frey et al. |
| 2005/0146682 A1 | 7/2005 | Kaga |
| 2006/0044510 A1 | 3/2006 | Williams |
| 2006/0092374 A1 | 5/2006 | Ishak |
| 2006/0164593 A1 | 7/2006 | Peyghambarian |
| 2007/0045596 A1 | 3/2007 | King et al. |
| 2008/0180803 A1 | 7/2008 | Seybert et al. |
| 2009/0091705 A1 | 4/2009 | Matsui |

FOREIGN PATENT DOCUMENTS

| | | |
|---|---|---|
| EP | 0578833 | 1/1994 |
| EP | 0649044 | 4/1995 |
| GB | 2170613 A | 8/1986 |
| GB | 2169417 A | 7/1987 |
| JP | 55-076323 | 6/1980 |
| JP | 61 156227 | 7/1986 |
| JP | 1 237610 | 9/1989 |
| JP | 05-100201 | 4/1993 |
| JP | 7-28002 | 1/1995 |
| JP | 11352445 | 12/1998 |
| JP | 2007-323062 | 12/2007 |
| TW | 460279 | 10/2001 |
| WO | WO-92/01417 | 2/1992 |
| WO | WO 93/21010 | 10/1993 |
| WO | WO-98/27863 | 7/1998 |
| WO | WO-99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

International Search Report for International Application No. PCT/US08/58930, dated Jul. 21, 2008.

Kowel, Stephen T., et. al; Focusing by electrical modulation of refraction in a liquid crystal cell; Applied Optics; Jan. 15, 1984; vol. 23, No. 2.

Thibos, Larry N., et. al.; Vision through a liquid-crystal spatial light modulator; Adaptive Optics Conference; 1999; Durham, UK.

Miller, Donald T., et. al.; Requirements for Segmented Spatial Light Modulators for Diffraction-Limited Imaging Through Aberrated Eyes, Adaptive Optics Conference.

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21$^{st}$ Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1, p. 1 only.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

Thibos et al., "Electronic spectacles for the 21$^{st}$ century," Indiana Journal of Optometry, 1999, vol. 2, No. 1, pp. 6-10.

* cited by examiner

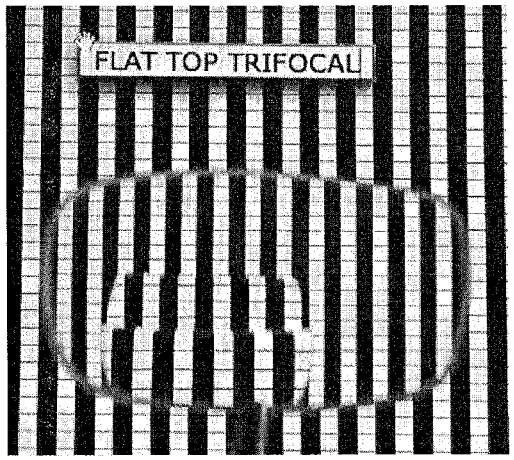 
Figure 9A  Figure 9B
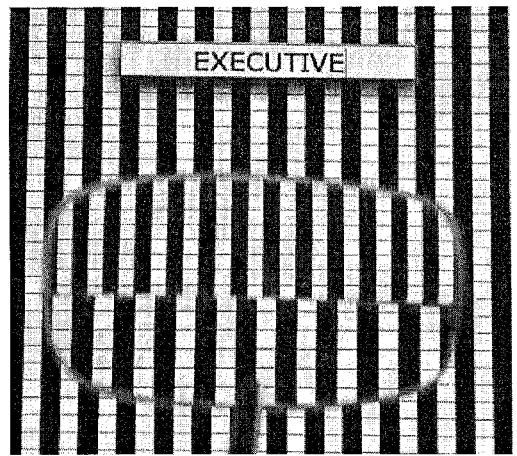 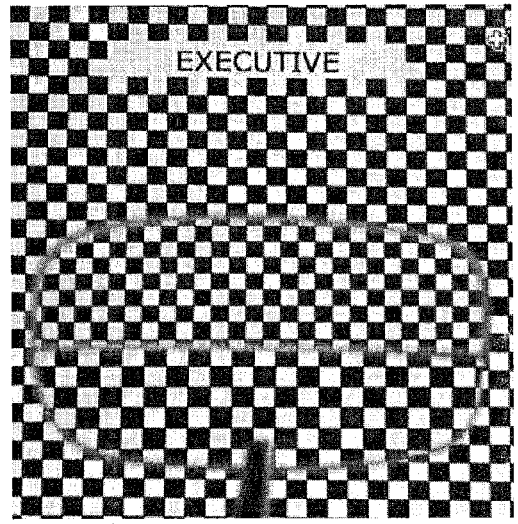
Figure 10A  Figure 10B

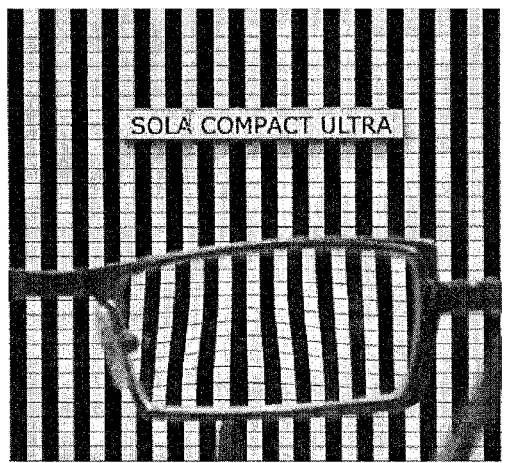 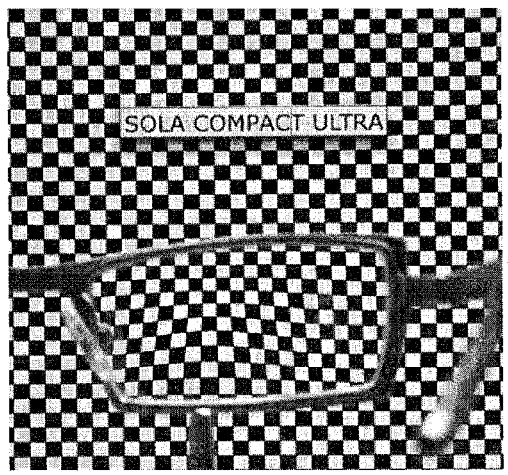
Figure 13A  Figure 13B
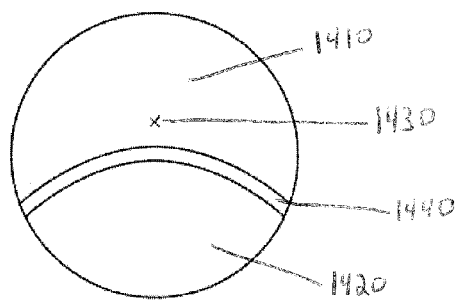
Figure 14A
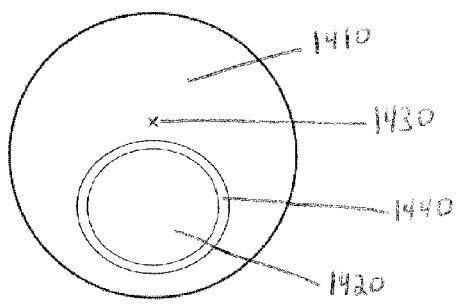
Figure 14B

| MEASURED AT OR FROM FITTING POINT | Essilor Physio +1.25 D Add Regular Channel | Essilor Ellipse +1.25 D Add Short Channel | Shamir Piccolo +1.25 D Add Short Channel |
|---|---|---|---|
| Fitting Point | +0.02 D | +0.12 D | 0.0 D |
| FP- 3 mm | +0.18 D | +0.32 D | +0.20 D |
| FP-6 mm | +0.36 D | +0.54 D | +0.41 D |
| FP- 9 mm | +0.63 D. | +0.82 D | +0.68 D |
| FP –12 mm | +0.88 D | +1.08 D | +0.98 D |
| FP –15 mm | +1.09 D | +1.25 D | +1.15 D |

Figure 17

| MEASUREMENT AT OR FROM FITTING POINT | Essilor Physio PAL Surface Combined with Spherical Component | Essilor Ellipse PAL Surface Combined with Spherical Component | Shamir Piccolo PAL Surface Combined with Spherical Component |
|---|---|---|---|
| Fitting Point | +0.02 D | +0.12 D | +0.0 D |
| FP- 3 mm | +1.18 D | +1.32 D | +1.20 D |
| FP-6 mm | +1.36 D | +1.54 D | +1.41 D |
| FP- 9 mm | +1.63 D. | +1.82 D | +1.68 D |
| FP –12 mm | +1.88 D | +2.08 D | +1.98 D |
| FP –15 mm | +2.09 D | +2.25 D | +2.15 D |

Figure 18

| INVENTIVE LENS | PHYSIO LENS |
| 2.25 D ADD | 2.25 D ADD |
| 1.25 D ROUND SEG + 1.00 D ADD PROG | |

| MEASURED AT OR BELOW THE FITTING POINT | Inventive Lens Power +2.25 D Add | Physio Power +2.25 D Add |
|---|---|---|
| Fitting Point | +0.25 D | + 0.06 D |
| FP- 3 mm | +0.60 D | + 0.24 D |
| FP-6 mm | +1.30 D | + 0.60 D |
| FP- 9 mm | + 1.60 D | + 1.10 D |
| FP -12 mm | +2.00 D | +1.55 D |
| FP -15 mm | + 2.10 D | + 1.85 D |

MULTIFOCAL LENS HAVING A PROGRESSIVE OPTICAL POWER REGION AND A DISCONTINUITY

CROSS REFERENCE TO RELATED APPLICATIONS

This application claims priority from and incorporates by reference in their entirety the following provisional applications:

U.S. Ser. No. 60/905,304 filed on 7 Mar. 2007 and entitled "Advanced and Enhanced Progressive Addition Lens";

U.S. Ser. No. 60/907,097 filed on 21 Mar. 2007 and entitled "Toric & Spherical Additive Power Curves in Association with Progressive Addition Surface";

U.S. Ser. No. 60/935,226 filed on 1 Aug. 2007 and entitled "Combined Optics for Correction of Near and Intermediate Vision";

U.S. Ser. No. 60/935,492 filed on 16 Aug. 2007 and entitled "Diamond Turning of Tooling to Generate Enhanced Multi-Focal Spectacle Lenses";

U.S. Ser. No. 60/935,573 filed on 20 Aug. 2007 and entitled "Advanced Lens with Continuous Optical Power"

U.S. Ser. No. 60/956,813 filed on 20 Aug. 2007 and entitled "Advanced Multifocal Lens with Continuous Optical Power"; and U.S. Ser. No. 60/970,024 filed on 5 Sep. 2007 and entitled "Refined Enhanced Multi-Focal".

BACKGROUND OF THE INVENTION

1. Field of the Invention

The present invention relates to multifocal ophthalmic lenses, lens designs, lens systems, and eyewear products or devices utilized on, in or about the eye. More specifically, the present invention relates to multifocal ophthalmic lenses, lens designs, lens systems, and eyewear products which, in most cases, reduce unwanted distortion, unwanted astigmatism, and vision compromises associated with Progressive Addition Lenses to a very acceptable range for a wearer.

2. Description of the Related Art

Presbyopia is the loss of accommodation of the crystalline lens of the human eye that often accompanies aging. This loss of accommodation first results in an inability to focus on near distance objects and later results in an inability to focus on intermediate distance objects. The standard tools for correcting presbyopia are multifocal ophthalmic lenses. A multifocal lens is a lens that has more than one focal length (i.e. optical power) for correcting focusing problems across a range of distances. Multifocal ophthalmic lenses work by means of a division of the lens's area into regions of different optical powers. Typically, a relatively large area located in the upper portion of the lens corrects for far distance vision errors, if any. A smaller area located in the bottom portion of the lens provides additional optical power for correcting near distance vision errors caused by presbyopia. A multifocal lens may also contain a region located near the middle portion of the lens, which provides additional optical power for correcting intermediate distance vision errors. Multifocal lenses may be comprised of continuous or discontinuous surfaces that create continuous or discontinuous optical power.

The transition between the regions of different optical power may be either abrupt, as is the case with bifocal and trifocal lenses, or smooth and continuous, as is the case with Progressive Addition Lenses. Progressive Addition Lenses are a type of multifocal lens which comprises a gradient of continuously increasing positive dioptric optical power from the far distance zone of the lens to the near distance zone in the lower portion of the lens. This progression of optical power generally starts at or near what is known as the fitting cross or fitting point of the lens and continues until the full add power is realized in the near distance zone of the lens. Conventional and state-of-the-art Progressive Addition Lenses utilize a surface topography on one or both exterior surfaces of the lens shaped to create this progression of optical power. Progressive Addition Lenses are known within the optical industry when plural as PALs or when singular as a PAL. PALs are advantageous over traditional bifocal and trifocal lenses because they can provide a user with a lineless, cosmetically pleasing multifocal lens with continuous vision correction and no perceived image break as the user's focus transitions from objects at a far distance to objects at a near distance or vice versa.

While PALs are now widely accepted and in vogue within the United States and throughout the world as a correction for presbyopia, they also have serious vision compromises. These compromises include, but are not limited to, unwanted astigmatism, distortion, and swim. These vision compromises may affect a user's horizontal viewing width, which is the width of the visual field that can be seen clearly as a user looks from side to side while focused at a given distance. Thus, PALs may have a narrow horizontal viewing width when focusing at an intermediate distance, which can make viewing a large section of a computer screen difficult. Similarly, PALs may have a narrow horizontal viewing width when focusing at a near distance, which can make viewing the complete page of a book or newspaper difficult. Far distance vision may be similarly affected. PALs may also make it difficult for a wearer to play sports due to the distortion of the lenses. In addition to these limitations, many wearers of PALs experience an unpleasant effect known as visual motion (often referred to as "swim") due to the distortion that exists in each of the lenses. In fact, many people refuse to wear such lenses because of the discomfort from this effect.

When considering the near distance optical power needs of a presbyopic individual, the amount of near distance optical power required is inversely proportional to the amount of accommodative amplitude (near distance focusing ability) the individual has left in his or her eyes. Generally, as an individual ages the amount of accommodative amplitude decreases. Accommodative amplitude may also decrease for various health reasons. Therefore, as one ages and becomes more presbyopic, the optical power needed to correct one's ability to focus at a near distance and an intermediate distance becomes stronger in terms of the needed dioptric optical power. The near and intermediate distance optical power is usually stated in terms of an "add power" or "additive optical power". An add power is the amount of optical power over the far distance vision correction. Add power usually refers to the optical power added to the far distance vision correction to achieve proper near distance vision correction. For example, if one has −1.00 D of optical power correction for far distance viewing and +1.00 D of optical power correction for near distance viewing such an individual is said to have +2.00 D of near distance add power.

By comparing the different near distance add power needs of two individuals, it is possible to directly compare each individual's near point focusing needs. By way of example only, an individual 45 years old may need +1.00 D of near distance add power to see clearly at a near point distance, while an individual 80 years old may need +2.75 D to +3.50 D of near distance add power to see clearly at the same near point distance. Because the degree of vision compromises in PALs increases with dioptric add power, a more highly presbyopic individual will be subject to greater vision compromises. In the example above, the individual who is 45 years of age will have a lower level of distortion and wider intermediate distance and near distance vision zones associated with his or her lenses than the individual who is 80 years of age. As is readily apparent, this is the complete opposite of what is needed given the quality of life issues associated with being elderly, such as frailty or loss of dexterity. Prescription multifocal lenses that add compromises to vision function and inhibit safety are in sharp contrast to lenses that make lives easier, safer, and less complex.

By way of example only, a conventional PAL with a +1.00 D near distance add power may have approximately 1.00 D or less of unwanted astigmatism. However, a conventional PAL with a +2.50 D near distance add power may have approximately 2.75 D or more of unwanted astigmatism while a conventional PAL with a +3.25 D near distance add power may have approximately 3.75 D or more of unwanted astigmatism. Thus, as a PAL's near distance add power increases (for example, a +2.50 D PAL compared to a +1.00 D PAL), the unwanted astigmatism found within the PAL increases at a greater than linear rate.

More recently, a double-sided PAL has been developed which has a progressive addition surface topography placed on each external surface of the lens. The two progressive addition surfaces are aligned and rotated relative to one another to not only give the appropriate total additive near distance add power required, but also to have the unwanted astigmatism created by the PAL on one surface of the lens counteract some of the unwanted astigmatism created by the PAL on the other surface of the lens. Even though this design reduces the unwanted astigmatism and distortion for a given near distance add power as compared to traditional PALs, the level of unwanted astigmatism, distortion, and other vision compromises listed above still causes serious vision problems for certain wearers.

Other multifocal lenses have been developed which provide for the placement of continuous and/or discontinuous optical elements in optical communication with one another. However, these lenses have not realized an optimal placement and alignment of the continuous and/or discontinuous elements. These lenses have also failed to realize an optimal optical power distribution in the optical elements placed in optical communication. Therefore, these lenses typically have one or more perceived image breaks, prismatic image jump, cosmetic issues, surface discontinuities, poor vision ergonomics, and/or an optical power gradient that is too steep. These issues typically translate into visual fatigue, eyestrain, and headaches for a wearer of these lenses. These lenses have also failed to realize an upper far-intermediate distance zone, a far-intermediate zone having a plateau of optical power, and a intermediate zone having a plateau of optical power.

Therefore, there is a pressing need to provide a spectacle lens and/or eyewear system that satisfies the vanity needs of presbyopic individuals and at the same time corrects their presbyopia in a manner that reduces distortion and blur, widens the horizontal viewing width, allows for improved safety, and allows for improved visual ability when playing sports, working on a computer, and reading a book or newspaper.

SUMMARY OF THE INVENTION

In an embodiment of the present invention an ophthalmic lens has a far distance zone and a fitting point. The ophthalmic lens may include a mostly spherical power region for providing additive optical power to the far distance zone for providing an intermediate distance zone of the lens. The ophthalmic lens may further include a discontinuity located between the far distance zone and the mostly spherical power region. The ophthalmic lens may further include a progressive optical power region starting at a portion of the mostly spherical power region for providing additive optical power to the mostly spherical power region for providing a near distance zone of the lens.

In an embodiment of the present invention an ophthalmic lens has a far distance zone and a fitting point. The ophthalmic lens may include a mostly spherical power region for providing additive optical power to the far distance zone for providing an upper far-intermediate distance zone of the lens. The ophthalmic lens may further include a discontinuity located between the far distance zone and the mostly spherical power region. The ophthalmic lens may further include a progressive optical power region starting at a portion of the mostly spherical power region for providing additive optical power to the mostly spherical power region for providing an intermediate distance zone of the lens and a near distance zone of the lens.

In an embodiment of the present invention an ophthalmic lens has a far distance zone and a fitting point. The ophthalmic lens may include a mostly spherical power region for providing additive optical power to the far distance zone. The ophthalmic lens may further include a discontinuity located between the far distance zone and the mostly spherical power region. The ophthalmic lens may further include a progressive optical power region for providing additive optical power to the mostly spherical power region for providing an intermediate distance zone of the lens and a near distance zone of the lens. The ophthalmic lens may further include a plateau of optical power located in a portion of the progressive optical power region for providing vertical stability of vision in a zone of the lens.

In an embodiment of the present invention an ophthalmic lens has a far distance zone, an intermediate distance zone, and a near distance zone. The ophthalmic lens may include a mostly spherical power region for providing additive optical power to the far distance zone. The ophthalmic lens may further include a discontinuity located between the far distance zone and the mostly spherical power region. The ophthalmic lens may further include a progressive optical power region, wherein a portion of the progressive optical power region contributes a negative optical power to the mostly spherical power region.

In an embodiment of the present invention an ophthalmic lens has a far distance zone, an upper far-intermediate zone, an intermediate distance zone, and a near distance zone. The ophthalmic lens may include a progressive optical power region. The ophthalmic lens may further include a first plateau of optical power located in a portion of the progressive optical power region for providing vertical stability of vision in the upper far-intermediate distance zone.

In an embodiment of the present invention an ophthalmic lens has a far distance zone, an intermediate distance zone, and a near distance zone. The ophthalmic lens may include a mostly spherical power region for providing additive optical power to the far distance zone. The ophthalmic lens may further include a discontinuity located between the far distance zone and the mostly spherical power region. The ophthalmic lens may further include a progressive optical power region spaced apart from and below the discontinuity for providing additive optical power to the mostly spherical power region.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which:

FIGS. 1A-13B show different lenses either having a perceived image break or not having a perceived image break;

FIG. 14A shows a view of the front surface of a lens according to an embodiment of the present invention having two optical power regions and a blend zone;

FIG. 14B shows a view of the front surface of a lens according to an embodiment of the present invention having two optical power regions and a blend zone;

FIG. 17 shows measurements taken from the fitting point down the channel of the add power found in the three lenses of FIG. 16 as measured by a Rotlex Class Plus™ trademarked by Rotlex;

FIG. 18 shows measurements taken from the fitting point down the channel of the add power found in embodiments of the present invention in which a mostly spherical power region having an optical power of +1.00 D is placed in optical communication with the lenses of FIG. 16;

DESCRIPTION OF THE PREFERRED EMBODIMENT

Figure 1A:
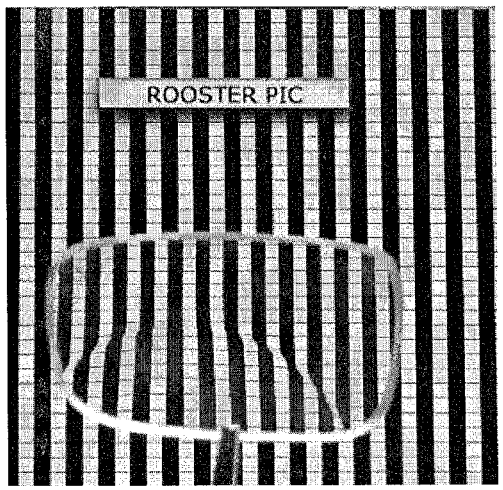

Many ophthalmological, optometric, and optical terms are used in this application. For the sake of clarity, their definitions are listed below:

Add Power: Add power represents the additional plus optical power required for near distance vision and/or intermediate distance vision. It is most commonly prescribed for presbyopia when the normal accommodative power of the eye is no longer sufficient to focus on near distance or intermediate distance objects. It is called an "add" power, because it is in addition to the far distance optical power of a lens. For example, if an individual has a far distance viewing prescription of −3.00 D and a +2.00 D add power for near distance viewing then the actual optical power in the near distance portion of the multifocal lens is the sum of the two powers, or −1.00 D. Add power is sometimes referred to as plus optical power or additive optical power. Add power may also refer to the add power in the intermediate distance portion of the lens and is called the "intermediate distance add power". Typically, the intermediate distance add power is approximately 50% of the near distance add power. Thus, in the example above, the individual would have +1.00 D add power for intermediate distance viewing and the actual total optical power in the intermediate distance portion of the multifocal lens would be −2.00 D.

Blend Zone: A zone which transitions the optical power difference across at least a portion of an optical power discontinuity of a lens, where the discontinuity is located between a first optical power and a second optical power. The difference between the first and second optical powers may be caused, for example, by different surface topographies or by different indices of refraction. The optical power transitions continuously from the first optical power to the second optical power across the blend zone. When diffractive optics are used, the blend zone can include blending the optical efficiency of the peripheral region of the diffractive optics. A blend zone is utilized for cosmetic enhancement reasons. A blend zone is typically not considered a usable portion of the lens due to its poor optics. A blend zone is also known as a transition zone.

Channel: The region of a lens defined by increasing plus optical power, centered by the umbilic of the lens, which extends from the far distance zone to the near distance zone and is free of unwanted astigmatism greater than 1.00 D. For a Progressive Addition Lens this optical power progression starts approximately in an area of the lens known as the fitting point and ends in the near distance zone. However, in embodiments of the present invention which have a progressive optical power region, the channel may start between approximately 4 mm and approximately 10 mm below the fitting point. The channel is sometimes referred to as the corridor.

Channel Length: The channel length is the distance measured from the defined start of the channel where the optical power first begins to increase to the location in the channel where the add power is within approximately 85% of the specified near distance viewing power of the lens. The channel typically starts at or near the fitting point.

Channel Width: The narrowest portion of the channel bounded by an unwanted astigmatism that is above approximately 1.00 D. This definition is useful when comparing lenses, due to the fact that a wider channel width generally correlates with less blur, less distortion, better visual performance, increased visual comfort, and easier adaptation to the channel for the wearer.

Continuous Optical Power: Optical power that is either substantially constant or that changes in a manner that does not create a perceived image break.

Continuous Surface: A refractive surface that does not cause a perceived image break. A continuous surface can be external or internal to the lens. If internal it would have a different index of refraction than the material adjacent to it. An example of a continuous surface is the surface of a substantially spherical lens or a Progressive Addition Lens.

Contour Maps: Plots that are generated from measuring and plotting the optical power changes and/or the unwanted astigmatic optical power of a lens. A contour plot can be generated with various sensitivities of astigmatic optical power thus providing a visual picture of where, and to what extent a lens possesses unwanted astigmatism as an effect due to its optical design. Analysis of such maps can be used to quantify the channel length, channel width, reading width and far distance width of a lens. Contour maps may be referred to as unwanted astigmatic power maps, sphere power maps, mean power maps, add power maps, or power error maps. These maps can also be used to measure and portray optical power in various parts of the lens.

Conventional Channel Length: Due to aesthetic concerns or trends in eyewear fashion, it may be desirable, due to frame styles, to have a lens that is foreshortened vertically to fit the frame. In such a lens, to deliver sufficient near distance vision, the channel is naturally also shortened. Conventional channel length refers to the length of a channel in a non-foreshortened lens. These channel lengths are usually, but not always, approximately 15 mm or longer. Generally, a longer channel length means a wider channel width and less unwanted astigmatism compared to PALs with a shorter channel length.

Discontinuity: A discontinuity is an optical power change or a surface change that results in a perceived image break for a user. A discontinuity may be caused by a step up or a step down in optical power between two regions of a lens. For example, a discontinuity of 0.10 D refers to a step up or down of 0.10 D between two regions of a lens.

Discontinuous Optical Power: Optical power that changes in a manner that creates a perceived image break.

Discontinuous Surface: A surface that causes a perceived image break. A discontinuous surface can be external or internal to the lens. If internal it would have a different index of refraction than the material adjacent to it. By way of example only, a discontinuous surface is the surface of a lined bifocal lens where the surface changes from the far distance zone to the near distance zone of the lens.

Dynamic lens: A lens with an optical power that is alterable with the application of electrical energy, mechanical energy, or force. The optical power of a dynamic lens is alterable without additional grinding or polishing. Either the entire lens may have an alterable optical power, or only a portion, region, or zone of the lens may have an alterable optical power. The optical power of such a lens is dynamic or tunable such that the optical power can be switched between two or more optical powers. One of the optical powers may be that of substantially no optical power. Examples of dynamic lenses include electro-active lenses, electrical meniscus lenses, a lens having one or more mechanically moving parts, or a lens made from a conformable membrane such as a gas lens or a fluid lens. A dynamic lens may also be referred to as a dynamic optic or a dynamic optical element. A dynamic lens may also be referred to as a transmissive adaptive optic or lens.

Far-Intermediate Distance Zone: The portion or region of a lens containing an optical power which allows a user to see clearly at a far-intermediate distance. The far-intermediate distance zone may be located between the far distance zone and intermediate distance zone of a lens, in which case it is referred to as the "upper far-intermediate distance zone". It may also be located below the near distance zone of the lens, in which case it is referred to as the "lower far-intermediate distance zone". The far-intermediate distance zone may also be referred to as a far-intermediate vision zone.

Far-Intermediate Distance: The distance to which one looks, by way of example only, when viewing to the far edge of one's desk. This distance is usually, but not always, considered to be between approximately 29 inches and approximately 5 feet from the eye and in some cases may be between approximately 29 inches and approximately 10 feet from the eye. The far-intermediate distance may also be referred to as a far-intermediate viewing distance or a far-intermediate distance point.

Far Distance Reference Point: A reference point located approximately 4-8 mm above the fitting cross where the far distance prescription or far distance optical power of a PAL can be easily measured.

Far Distance Zone: The portion or region of a lens containing an optical power which allows a user to see clearly at a far distance. The far distance zone may also be referred to as the far vision zone.

Far Distance Width: The narrowest horizontal width within the far distance viewing portion of the lens, approximately 4-8 mm above the fitting point, which provides clear, mostly blur-free correction with an optical power within 0.25 D of the wearer's far distance optical power correction.

Far Distance: The distance to which one looks, by way of example only, when viewing beyond the edge of one's desk, when driving a car, when looking at a distant mountain, or when watching a movie. This distance is usually, but not always, considered to be greater than approximately 5 feet from the eye and in some cases may be greater than approximately 10 feet from the eye. "Far distance" is not to be confused with far infinity which is approximately 20 feet or further from the eye. At far infinity, the eye's accommodative system is fully relaxed. The optical power provided in one's optical prescription to correct for approximately 5 feet (or 10 feet) from the eye or greater is typically not significantly different from the optical power needed to correct for approximately 20 feet from the eye. Therefore, as used herein, far distance refers to distances approximately 5 feet (or 10 feet) from the eye and greater. The far distance may also be referred to as far viewing distance and a far distance point.

Fitting Cross/Fitting Point: A reference point on a lens that represents the approximate location of a wearer's pupil when looking straight ahead through the lens once the lens is mounted in an eyeglass frame and positioned on the wearer's face. The fitting cross/fitting point is usually, but not always, located approximately 2 mm-5 mm vertically above the start of the channel. The fitting cross may have a very slight amount of plus optical power ranging from just over +0.00 D to approximately +0.12 D. This point or cross is typically ink-marked on the lens surface to provide an easy reference point for measuring and/or double-checking the fitting of the lens relative to the pupil of the wearer. The mark is easily removed upon dispensing the lens to the wearer.

Hard or Soft Progressive Addition Region: A progressive addition zone with a fast or slow rate of optical power change or astigmatic power change is referred to as a hard or soft progressive addition region, respectively. A lens that contains mostly fast rates of change may be referred to as a "hard progressive addition lens". A lens that contains mostly slow rates of change may be referred to as a "soft progressive addition lens". PALs may contain both hard and soft zones depending on the corridor length chosen, add power needed, and the designer's mathematical tools.

Hard Progressive Addition Lens: A Progressive Addition Lens with a less gradual, steeper transition between the far distance correction and the near distance correction. In a hard PAL, the unwanted distortion may be below the fitting point and not spread out into the periphery of the far distance region of the lens. A hard PAL may, in some cases, also have a shorter channel length and a narrower channel width. A "modified hard Progressive Addition Lens" is a PAL which comprises a slightly modified hard PAL optical design having one or more characteristics of a soft PAL such as: a more gradual optical power transition, a longer channel, a wider channel, more unwanted astigmatism spread out into the periphery of the lens, and less unwanted astigmatism below the fitting point.

Horizontal Stability of Optical Power: A region or zone of a lens that has mostly constant optical power across the horizontal width of the region or zone. Alternatively, the optical power change may be an average of approximately 0.05 D per millimeter or less across the horizontal width of the region or zone. As another alternative, the optical power change may be an average of approximately 0.10 D per millimeter or less across the horizontal width of the region or zone. As a final alternative, the optical power change may be an average of approximately 0.20 D per millimeter or less across the horizontal width of the region or zone. The region or zone may have a horizontal width of approximately 1 mm or greater. As an alternative, the region or zone may have a horizontal width of approximately 1 mm to approximately 3 mm or greater. As a final alternative, the region or zone may have a horizontal width of approximately 2 mm to approximately 6 mm or greater. The region or zone may be the far distance zone, the upper far-intermediate distance zone, the intermediate distance zone, the near distance zone, the lower far-intermediate distance zone, or any other region of the lens.

Horizontal Stability of Vision: A region or zone of a lens is said to have horizontal stability of vision if the region or zone has mostly constant clear vision as a user looks left and right across the region or zone. The region or zone may have a horizontal width of approximately 1 mm or greater. As an alternative, the region or zone may have a horizontal width of approximately 1 mm to approximately 3 mm or greater. As a final alternative, the region or zone may have a horizontal width of approximately 2 mm to approximately 6 mm or greater. The region or zone may be the far distance zone, the upper far-intermediate distance zone, the intermediate distance zone, the near distance zone, the lower far-intermediate distance zone, or any other region of the lens.

Figure 1B:
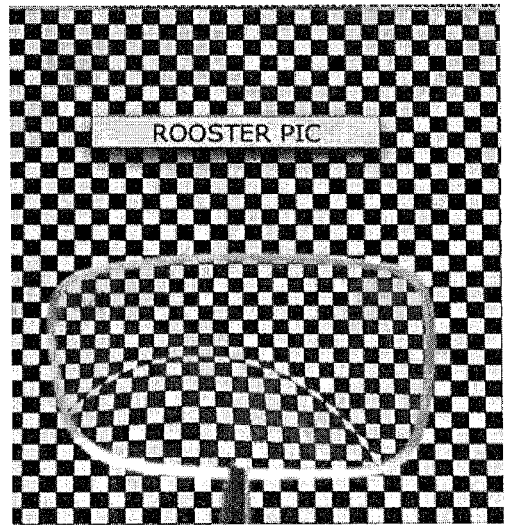
Figure 2A:
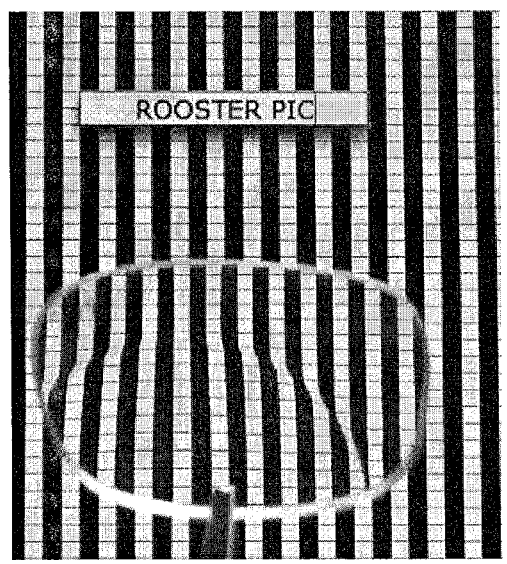
Figure 2B:
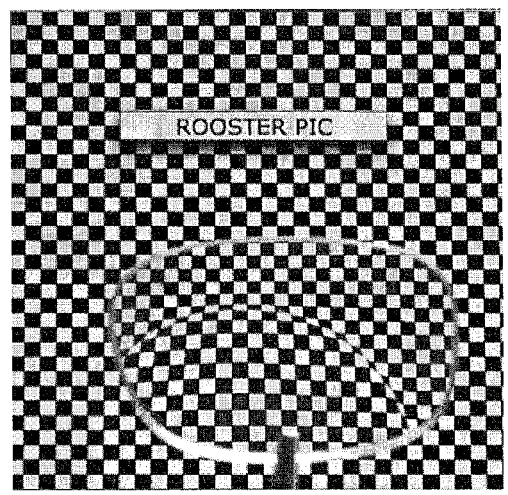
Figure 3A:
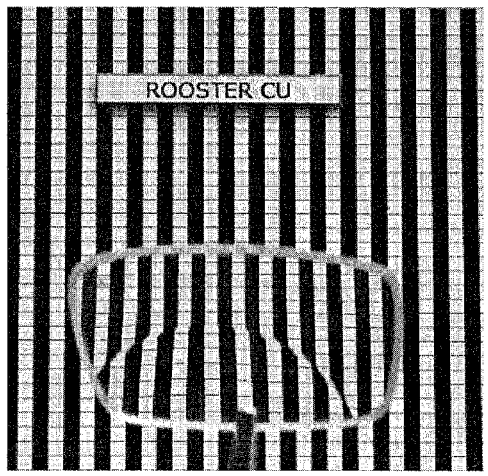
Figure 3B:
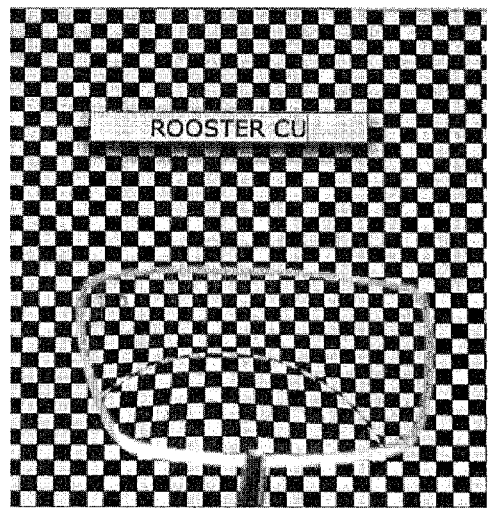
Figure 4A:
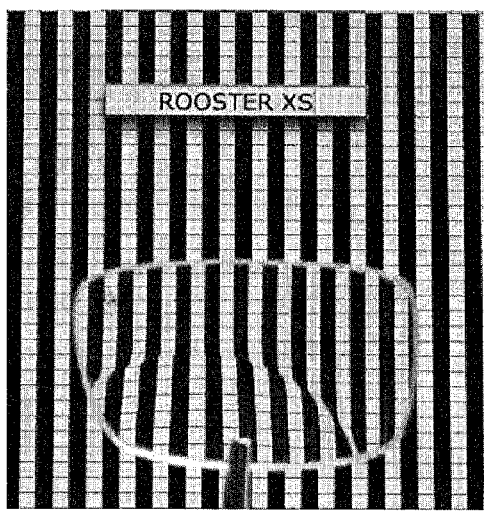
Figure 4B:
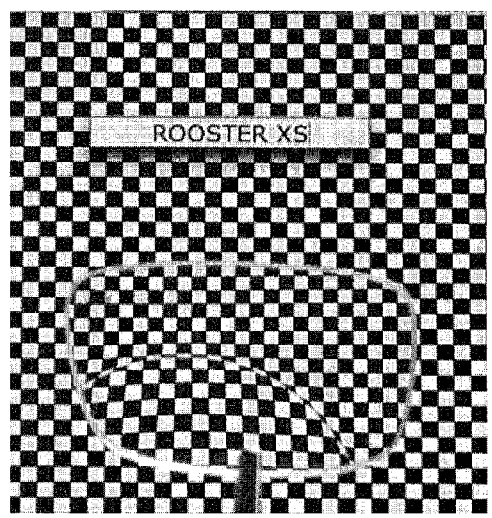
Figure 5A:
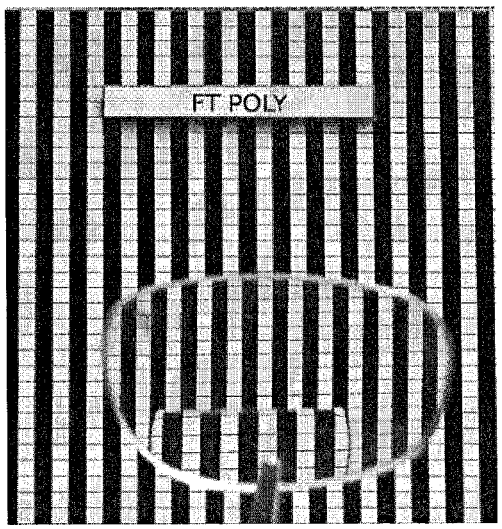
Figure 5B:
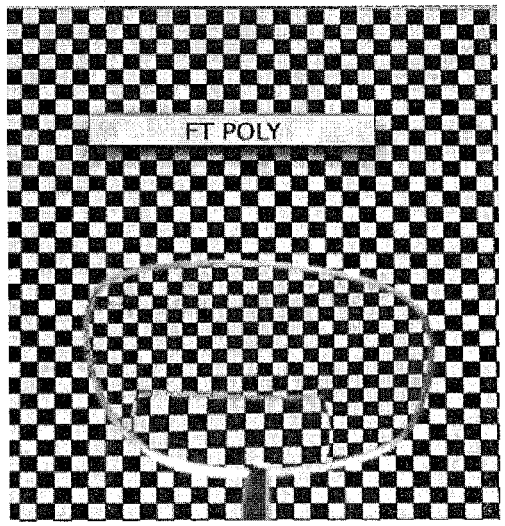
Figure 6A:
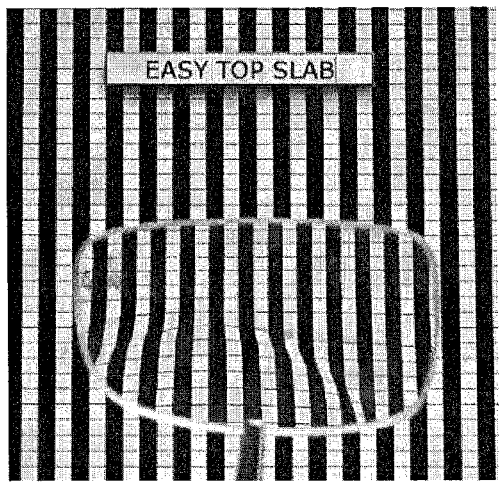
Figure 6B:
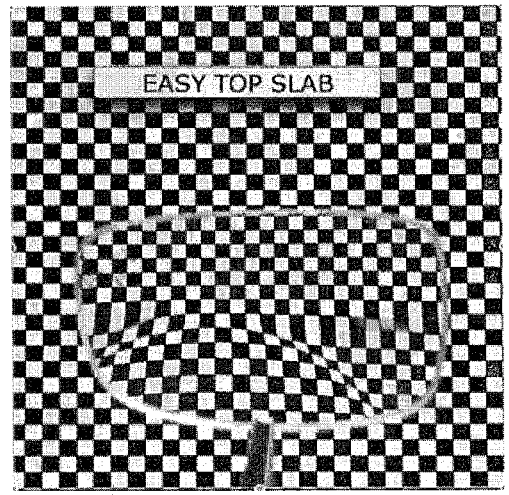
Figure 7A:
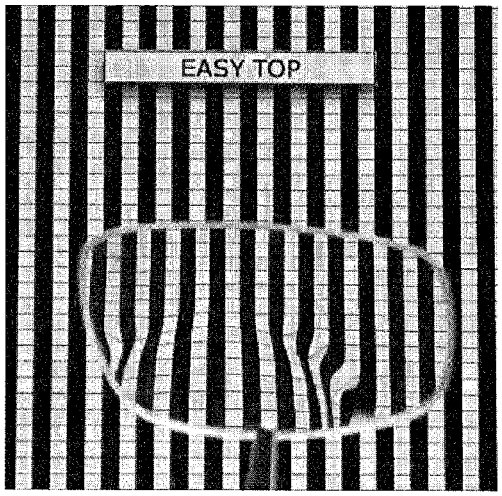
Figure 7B:
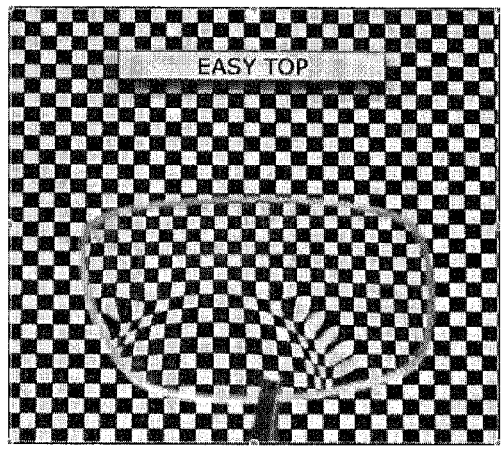
Figure 8A:
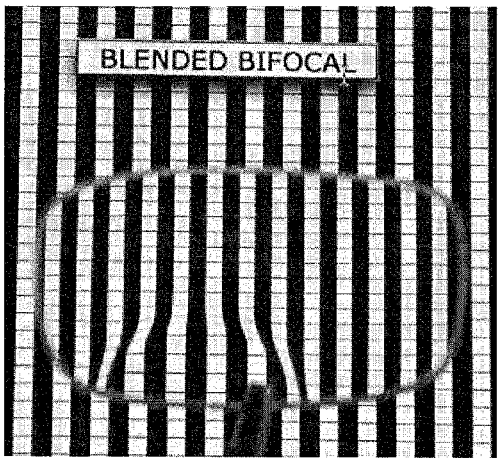
Figure 8B:
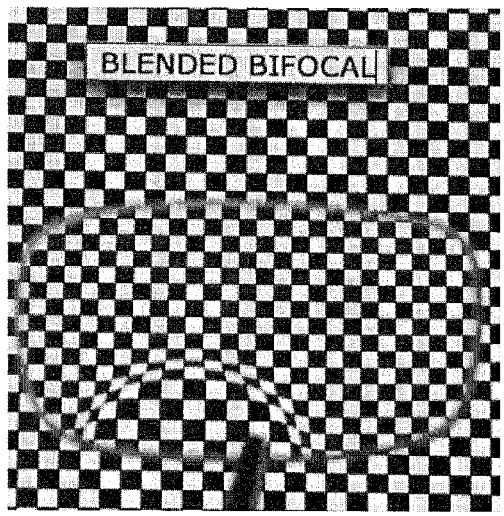
Figure 11A:
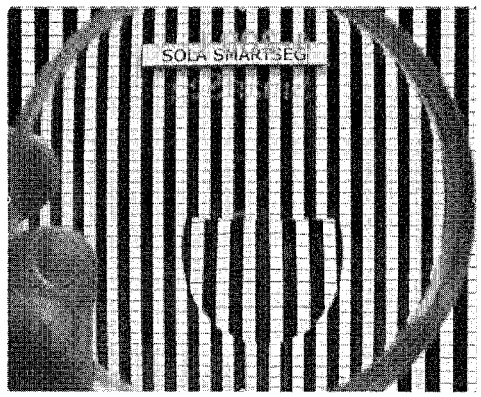
Figure 11B:
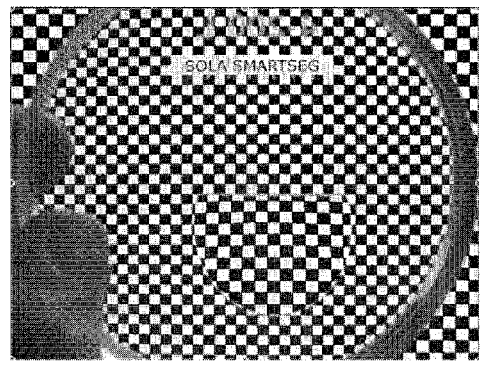
Figure 12A:
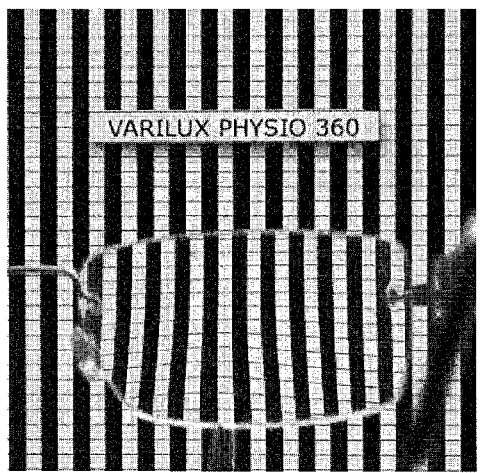
Figure 12B:
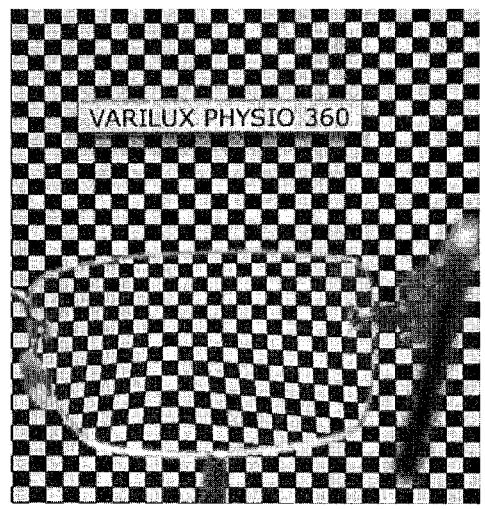

Image break: An image break is a perceived disruption in an image when looking through a lens. When an image break occurs, the image perceived through the lens is no longer seamless. An image break can be a prismatic displacement of the image across the image break, a magnification change of the image across the image break, a sudden blurring of the image at or around the image break, or a combination of all three. One method of determining whether a lens has an image break is to place the lens a fixed distance over a set of vertical lines, horizontal lines, or a grid. FIGS. 1A-10B show different lenses having −1.25 D far distance correction and +2.25 D add power held 6" from a laptop screen displaying either vertical lines or a grid photographed 19.5" from the laptop screen. FIGS. 1A and 1B show a lens according to an embodiment of the present invention. FIGS. 2A and 2B show a lens according to another embodiment of the present invention. FIGS. 3A and 3B show a lens according to another embodiment of the present invention. FIGS. 4A and 4B show a lens according to another embodiment of the present invention. FIGS. 5A and 5B show a flat top poly lens. FIGS. 6A and 6B show an easy top lens with slab-off prism. FIGS. 7A and 7B show an easy top lens. FIGS. 8A and 8B show a blended bifocal lens. FIGS. 9A and 9B show a flat top trifocal lens. FIGS. 10A and 10B show an executive lens. FIGS. 11A and 11B show a Sola SmartSeg™ lens trademarked by Sola Optical having −2.25 D far distance correction and +2.00 D add power held 6" from a laptop screen displaying either vertical lines or a grid photographed 19.5" from the laptop screen. FIGS. 12A-13B show different lenses having −1.25 D far distance correction and +2.25 D add power held 6" from a laptop screen displaying either vertical lines or a grid photographed 19.5" from the laptop screen. FIGS. 12A and 12B show a Varilux Physio 360™ lens trademarked by Essilor. FIGS. 13A and 13B show a Sola Compact Ultra™ lens trademarked by Carl Zeiss Vision. FIGS. 1A-11B show lenses which produce a perceived image break. FIGS. 12A-13B show lenses which do not produce a perceived image break.

Intermediate Distance Zone: The portion or region of a lens containing an optical power which allows a user to see clearly at an intermediate distance. The intermediate distance zone may also be referred to as the intermediate vision zone.

Intermediate Distance: The distance to which one looks, by way of example only, when reading a newspaper, when working on a computer, when washing dishes in a sink, or when ironing clothing. This distance is usually, but not always, considered to be between approximately 16 inches and approximately 29 inches from the eye. The intermediate distance may also be referred to as an intermediate viewing distance and an intermediate distance point. It should be pointed out that "intermediate distance" can also be referred to as "near-intermediate distance" since "near distance" is between approximately 10 inches to approximately 16 inches from the eye. Alternatively, only a portion of the "intermediate distance" which is closest to approximately 16 inches may be referred to as a "near-intermediate distance". "Far-intermediate distance" is not to be confused with "intermediate distance". "Far-intermediate distance" is instead between approximately 29 inches to approximately 5 feet (or 10 feet) from the eye.

Lens: Any device or portion of a device that causes light to converge or diverge. A lens may be refractive or diffractive. A lens may be either concave, convex, or plano on one or both surfaces. A lens may be spherical, cylindrical, prismatic, or a combination thereof. A lens may be made of optical glass, plastic, thermoplastic resins, thermoset resins, a composite of glass and resin, or a composite of different optical grade resins or plastics. A lens may be referred to as an optical element, optical preform, optical wafer, finished lens blank, or optic. It should be pointed out that within the optical industry a device can be referred to as a lens even if it has zero optical power (known as plano or no optical power). A lens is normally oriented as a person would wear the lens, such that the far distance zone of the lens is at the top and the near distance portion is at the bottom. The terms "upper", "lower", "above", "below", "vertical", "horizontal", "up", "down", "left", "right", "top", and "bottom" when used in reference to a lens may be taken with respect to this orientation.

Lens Blank: A device made of optical material that may be shaped into a lens. A lens blank may be "finished" meaning that the lens blank has both of its external surfaces shaped into refractive external surfaces. A finished lens blank has an optical power which may be any optical power including zero or plano optical power. A lens blank may be a "semi-finished" lens blank, meaning that the lens blank has been shaped to have only one finished refractive external surface. A lens blank may be an "unfinished" lens blank, meaning that neither external surface of the lens blank has been shaped into a refractive surface. An unfinished surface of an unfinished or semi-finished lens blank may be finished by means of a fabrication process known as free-forming or by more traditional surfacing and polishing. A finished lens blank has not had its peripheral edge shaped, edged, or modified to fit into an eyeglass frame. For the purposes of this definition a finished lens blank is a lens. However, once a lens blank is shaped, edged, or modified to fit an eyeglass frame it is no longer referred to as a lens blank.

Lined Multifocal Lens: A multifocal lens that has two or more adjacent regions of different optical power having a visible discontinuity that can be seen by someone looking at a wearer of the lens. The discontinuity causes a perceived image break between the two or more regions. Examples of a lined multifocal lens are lined (non-blended) bifocals or trifocals.

Lineless Multifocal Lens: A multifocal lens that has two or more adjacent regions of different optical power having either no discontinuity between the two or more regions such as in a progressive addition lens or an invisible discontinuity between the two or more regions which can not be seen by someone looking at a wearer of the lens. The discontinuity causes a perceived image break between the two or more regions. An example of a lineless multifocal lens having a discontinuity is a blended bifocal. A PAL can also be referred to as a lineless multifocal, but a PAL does not have a discontinuity.

Low Add Power PAL: A Progressive Addition Lens that has less than the necessary near add power for the wearer to see clearly at a near viewing distance.

Low Add Power Progressive Optical Power Region: A progressive optical power region that has less than the necessary near add power for the wearer to see clearly at a near viewing distance.

Multifocal Lens: A lens having more than one focal point or optical power. Such lenses may be static or dynamic. Examples of static multifocal lenses include a bifocal lens, a trifocal lens or a Progressive Addition Lens. Dynamic multifocal lenses include, by way of example only, electro-active lenses. Various optical powers may be created in the electro-active lens depending on the types of electrodes used, voltages applied to the electrodes, and index of refraction altered within a thin layer of liquid crystal. Dynamic multifocal lenses also include, by way of example only, lenses comprising a conformable optical member such as gas lenses and fluid lenses, mechanically adjustable lenses where two or more movable members adjust the optical power, or electrical meniscus lenses. Multifocal lenses may also be a combination of static and dynamic. For example, an electro-active element may be used in optical communication with a static spherical lens, a static single vision lens, a static multifocal lens such as, by way of example only, a Progressive Addition Lens, a flat top 28 bifocal, or a flat top 7×28 trifocal. In most, but not all, cases, multifocal lenses are refractive lenses. In certain cases, a multifocal lens may comprise diffractive optics and/or a combination of diffractive and refractive optics.

Near Distance Zone: The portion or region of a lens containing an optical power which allows a user to see clearly at a near distance. The near distance zone may also be referred to as the near vision zone.

Near Distance: The distance to which one looks, by way of example only, when reading a book, when threading a needle, or when reading instructions on a pill bottle. This distance is usually, but not always, considered to be between approximately 10 inches and approximately 16 inches from the eye. The near distance may also be referred to as a near viewing distance and a near distance point.

Office Lens/Office PAL: A specially designed occupational Progressive Addition Lens that replaces the far distance vision zone with that of a mostly intermediate distance vision zone and typically provides near distance vision in a near distance zone and intermediate distance vision in an intermediate distance zone. The optical power degresses from the near distance zone to the intermediate distance zone. The total optical power degression is less optical power change than the wearer's typical near distance add power. As a result, wider intermediate distance vision is provided by a wider channel width and also a wider reading width. This is accomplished by means of an optical design which typically allows greater values of unwanted astigmatism above the fitting cross. Because of these features, this type of PAL is well-suited for desk work, but one cannot drive his or her car or use it for walking around the office or home since the lens contains little if any far distance viewing area.

Ophthalmic Lens: A lens suitable for vision correction which includes, by way of example only, a spectacle lens, a contact lens, an intra-ocular lens, a corneal in-lay, and a corneal on-lay.

Optical Communication: The condition whereby two or more optical power regions are aligned in a manner such that light passes through the aligned regions and experiences a combined optical power equal to the sum of the optical power of each individual region at the points through which the light passes. The regions may be embedded within a lens or on opposite surfaces of the same lens or different lenses.

Optical Power Region: A region of a lens having an optical power.

Plateau of Optical Power: A region or zone of a lens that has mostly constant optical power across the horizontal width and/or vertical length of the region or zone. Alternatively, the optical power change may be an average of approximately 0.05 D per millimeter or less across the horizontal width and/or vertical length of the region or zone. As another alternative, the optical power change may be an average of approximately 0.10 D per millimeter or less across the horizontal width and/or vertical length of the region or zone. As a final alternative, the optical power change may be an average of approximately 0.20 D per millimeter or less across the horizontal width and/or vertical length of the region or zone.

The region or zone may have a horizontal width and/or vertical length of approximately 1 mm or greater. As an alternative, the region or zone may have a horizontal width and/or vertical length of approximately 1 mm to approximately 3 mm or greater. As a final alternative, the region or zone may have a horizontal width and/or vertical length of approximately 2 mm to approximately 6 mm or greater. A plateau of optical power allows for vertical stability and/or horizontal stability of optical power within the region. A plateau of optical power would be recognized visually by a wearer of a lens by moving his or her chin up and down or by looking left and right. If a region has a plateau of optical power the wearer will notice that an object at a given distance stays mostly in focus throughout the region. The region or zone may be the far distance zone, the upper far-intermediate distance zone, the intermediate distance zone, the near distance zone, the lower far-intermediate distance zone, or any other region of the lens.

Progressive Addition Region: A continuous region of a PAL that contributes a continuous, increasing optical power between the far distance zone of the PAL and the near distance zone of the PAL. The add power in the far distance zone at the start of the region is approximately +0.10 D or less. In some cases, the region may contribute a decreasing optical power after the full add power is reached in the near distance zone of the lens.

Progressive Addition Surface: A continuous surface of a PAL that contributes a continuous, increasing optical power between the far distance zone of the PAL and the near distance zone of the PAL. The add power in the far distance zone at the start of the surface is approximately +0.10 D or less. In some cases, the surface may contribute a decreasing optical power after the full add power is reached in the near distance zone of the lens.

Progressive Optical Power Region: A region of a lens having a first optical power, typically in an upper portion of the region and a second optical power, typically in a lower portion of the region wherein a continuous change in optical power exists therebetween. A progressive optical power region may be on a surface of a lens or embedded within a lens. A progressive optical power region may comprise one or more surface topographies known as a "progressive optical power surface". A progressive optical power surface may be on either surface of a lens or buried within the lens. A progressive optical power region is said to "begin" or "start" when the optical power is increased above the adjacent vision zone's optical power. Typically, this increase is a plus optical power of +0.12 D or greater. The increased plus optical power at the start of the progressive optical power region may be caused by a mostly continuous increase in positive optical power. Alternatively, the add power at the start of the progressive optical power region may be caused by a step in optical power which is either part of the progressive optical power region or part of a different optical power region. The step in optical power may be caused by a discontinuity. The optical power of the progressive optical power region may decrease after reaching its maximum add power. A progressive optical power region may begin at or near the fitting point as in a conventional Progressive Addition Lens or may begin below the fitting point as in embodiments of the present invention.

Reading Width: The narrowest horizontal width within the near distance viewing portion of the lens which provides clear, mostly distortion free correction with an optical power within 0.25 D of the wearer's near distance viewing optical power correction.

Short Channel Length: Due to aesthetic concerns or trends in eyewear fashion, it may be desirable to have a lens that is foreshortened vertically for fitting into a frame style which has a narrow, vertical height. In such a lens the channel is naturally also shorter. Short channel length refers to the length of a channel in a foreshortened lens. These channel lengths are usually, but not always between approximately 9 mm and approximately 13 mm. Generally, a shorter channel length means a narrower channel width and more unwanted astigmatism. Shorter channel designs are sometimes referred to as having certain characteristics associated with "hard" Progressive Addition Lens designs, since the transition between far distance correction and near distance correction is harder due to the steeper increase in optical power caused by the shorter vertical channel length.

Soft Progressive Addition Lens: A Progressive Addition Lens with a more gradual transition between the far distance correction and the near distance correction. This more gradual transition causes an increased amount of unwanted astigmatism. In a soft PAL the increased amount of unwanted astigmatism may intrude above an imaginary horizontal line located through the fitting point that extends across the lens. A soft PAL may also have a longer channel length and a wider channel width. A "modified soft Progressive Addition Lens" is a soft PAL which has a modified optical design having one or more of characteristics of a hard PAL such as: a steeper optical power transition, a shorter channel, a narrower channel, more unwanted astigmatism pushed into the viewing portion of the lens, and more unwanted astigmatism below the fitting point.

Static Lens: A lens having an optical power which is not alterable with the application of electrical energy, mechanical energy, or force. Examples of static lenses include spherical lenses, cylindrical lenses, Progressive Addition Lenses, bifocals, and trifocals. A static lens may also be referred to as a fixed lens.

Step in Optical Power: An optical power difference between two optical zones or regions that may result in an optical power discontinuity. The optical power difference may be a step up in optical power in which optical power increases between an upper portion and a lower portion of a lens. The optical power difference may be a step down in optical power in which optical power decreases between an upper portion and a lower portion of a lens. For example, if an upper portion of a lens has an optical power of +1.00 D, a "step up" in optical power of +0.50 D will result in a lower portion of the lens immediately after the step up in optical power (or discontinuity) having an optical power of +1.50 D. The optical power in the lower region is said to be "created" by the step in optical power.

Unwanted Astigmatism: Unwanted astigmatism found within a lens that is not part of the patient's prescribed vision correction, but rather is a byproduct of the optical design of the lens due to the smooth gradient of optical power that joins two optical power zones. Although, a lens may have varying unwanted astigmatism across different areas of the lens of various dioptric powers, the term "unwanted astigmatism" generally refers to the maximum unwanted astigmatism that is found in the lens. Unwanted astigmatism may also be further characterized as the unwanted astigmatism located within a specific portion of a lens as opposed to the lens as a whole. In such a case qualifying language is used to indicate that only the unwanted astigmatism within the specific portion of the lens is being considered. The wearer of the lens will perceive unwanted astigmatism as blur and/or distortion caused by the lens. It is well known and accepted within the optical industry that as long as the unwanted astigmatism and distortion of a lens is approximately 1.00 D or less, the user of the lens, in most cases, will barely notice it.

Vertical Stability of Optical Power: A region or zone of a lens that has mostly constant optical power across the vertical length of the region or zone. Alternatively, the optical power change may be an average of approximately 0.05 D per millimeter or less across the vertical length of the region or zone. As another alternative, the optical power change may be an average of approximately 0.10 D per millimeter or less across the vertical length of the region or zone. As a final alternative, the optical power change may be an average of approximately 0.20 D per millimeter or less across the vertical length of the region or zone. The region or zone may have a vertical length of approximately 1 mm or greater. As an alternative, the region or zone may have a vertical length of approximately 1 mm to approximately 3 mm or greater. As a final alternative, the region or zone may have a vertical length of approximately 2 mm to approximately 6 mm or greater. The region or zone may be the far distance zone, the upper far-intermediate distance zone, the intermediate distance zone, the near distance zone, the lower far-intermediate distance zone, or any other region of the lens.

Vertical Stability of Vision: A region or zone of a lens is said to have vertical stability of vision if the region or zone has mostly constant clear vision as a user looks up and down across the region or zone. However, it should be pointed out that while a PAL has clear vision from the far distance zone to the near distance zone, the optical power between these zones is blended. Therefore, a PAL has blended stability of vision between the far distance and near distance zones. Thus, a PAL has a very limited vertical stability of optical power between the far distance zone and the near distance zone. The region or zone may have a vertical length of approximately 1 mm or greater. As an alternative, the region or zone may have a vertical length of approximately 1 mm to approximately 3 mm or greater. As a final alternative, the region or zone may have a vertical length of approximately 2 mm to approximately 6 mm or greater. The region or zone may be the far distance zone, the upper far-intermediate distance zone, the intermediate distance zone, the near distance zone, the lower far-intermediate distance zone, or any other region of the lens.

The invention disclosed herein relates to embodiments of an optical design, lens, and eyewear system that solve many, if not most, of the problems associated with PALs. In addition, the invention disclosed herein significantly removes most of the vision compromises associated with PALs. The invention provides a means of achieving the proper far distance, intermediate distance, and near distance optical powers for the wearer while providing mostly continuous focusing ability for various distances. The invention may also provide a means of achieving the proper upper far-intermediate distance and/or lower far-intermediate distance optical powers for the wearer while providing mostly continuous focusing ability. The invention disclosed herein has far less unwanted astigmatism than a PAL. The invention disclosed herein allows for a full range of presbyopic correction with add powers from +1.00 D to +3.50 D in either +0.12 D steps or +0.25 D steps. For add power prescriptions below +3.00 D, the invention typically keeps the unwanted astigmatism to a maximum of approximately 1.00 D or less. For certain high add power prescriptions such as +3.00 D, +3.25 D, and +3.50 D, the invention typically keeps the unwanted astigmatism to a maximum of approximately 1.50 D.

Embodiments of the inventive lens and lens design disclosed herein allow for optically combining two discrete optical elements into one multifocal lens. The first optical element may have a mostly spherical power region that contributes a mostly spherical optical power. The second optical element may have a progressive optical power region that contributes a progressive optical power. The second optical element contributing progressive optical power does not provide enough add power for the user to see clearly at a near distance. The first optical element contributing a mostly spherical optical power provides an optical power in addition to that provided by the second optical element to allow the user to see clearly at a near distance. Because a portion of the add power is provided by the first optical element contributing mostly spherical optical power, the multifocal lens has less unwanted astigmatism than a PAL having the same total add power.

In an embodiment of the present invention, the first optical element may be a buried diffractive optic having a different index of refraction than the surrounding material of the lens. In another embodiment, the first optical element may be a buried refractive optic having a different index of refraction than the surrounding material of the lens. In another embodiment, the first optical element may be a buried electro-active element. In another embodiment, the first optical element may be on one or both surfaces of the lens and may be provided, for example, by grinding, molding, surface casting, stamping, or free forming an outer surface of the inventive lens.

In an embodiment of the present invention, the second optical element may be on one or both surfaces of the lens and may be provided, for example, by grinding, molding, surface casting, stamping, or free forming an outer surface of the inventive lens. In another embodiment, the second optical element may be buried within the lens and have a gradient of indices of refraction different than the surrounding material of the lens. Typically, but not always, if one of the optical elements is buried within the lens, the other optical element is located on one or both outer surfaces of the lens.

In an embodiment of the invention, the first optical element contributing mostly spherical optical power is in optical communication with at least a portion of the second optical element contributing progressive optical power. In another embodiment, the first optical element contributing mostly spherical optical power and the second optical element contributing progressive optical power are mathematically combined into a single optical element which may be on an outer refractive surface of the lens or buried within the lens.

Embodiments of the present invention provide for the proper alignment and positioning of the first optical element contributing mostly spherical optical power and the second optical element contributing progressive optical power. Embodiments of the present invention also provide for the amount of optical power provided by the mostly spherical power region, the amount of optical power provided by the progressive optical power region, and the optical design of the progressive optical power region. Embodiments of the present invention also provide for the size and shape of the mostly spherical power region and the size and shape of the progressive optical power region. The combination of these design parameters allows for a far superior optical design which has less unwanted astigmatism and distortion as well as both a wider channel width and a shorter channel length compared to state of the art PALs commercially available today.

Figure 14C:
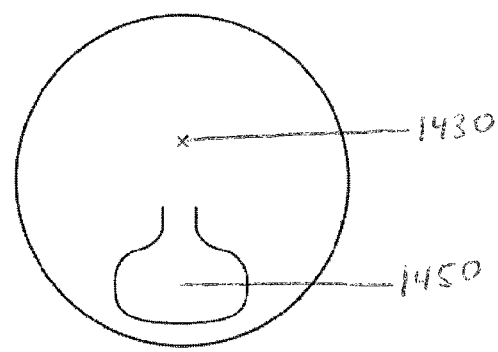
FIG. 14C shows a view of the back surface of the lens of FIG. 14A or FIG. 14B having a progressive optical power region below a fitting point of the lens.
Figure 14D:
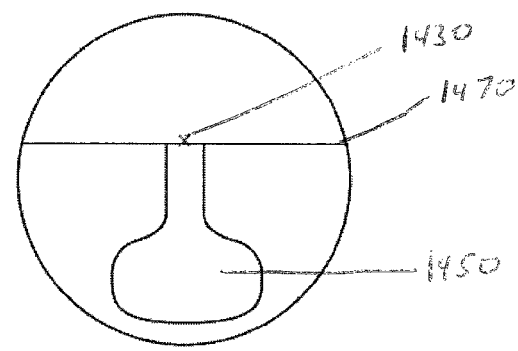
FIG. 14D shows a view of the back surface of the lens of FIG. 14A or FIG. 14B having a progressive optical power region at or near a fitting point of the lens.

It should be pointed out that the figures, and any features shown in the figures, are not drawn to scale. FIG. 14A shows a view of the front surface of a lens according to an embodiment of the present invention. FIG. 14B shows a view of the front surface of a different embodiment of the present invention. FIGS. 14A-14B show that the front convex surface of the inventive lens has two optical power regions. The first optical power region is a far distance zone 1410 in the upper portion of the lens. The second optical power region is a mostly spherical power region 1420 in the lower portion of the lens that contributes an additive optical power. In FIG. 14A, the mostly spherical power region is in the shape of an arched section of the lens. The arched section may be thought of as a circular region having a diameter much larger than the diameter of the lens. Because the circular region is too large for the lens, only the top arch of its perimeter fits within the lens. In FIG. 14B, the mostly spherical power region is a circular shape. The mostly spherical power region is located below a fitting point 1430. Alternatively, the mostly spherical power region may be located at or above the fitting point. A discontinuity in optical power exists between the far distance zone and the mostly spherical power region. At least a portion of the discontinuity may be blended by a blend zone 1440 located between the two optical power regions. The blend zone may be approximately 2.0 mm wide or less or approximately 0.5 mm wide or less. FIG. 14C shows a view of the back surface of the lens. FIG. 14C shows that the back concave surface of the lens has a progressive optical power region 1450 that contributes an additive optical power. It should be pointed out that when the progressive optical power region is found on the back concave surface of the lens in most, but not in all, cases the back concave surface also comprises toric curves to correct for the patient's astigmatic refractive error. The progressive optical power region starts below the fitting point of the lens. Alternatively, FIG. 14D shows the progressive optical power region starting at or near the fitting point of the lens. When the progressive optical power region starts at the upper edge of the mostly spherical power region, as in FIG. 14D, a step in optical power 1470 is provided that is additive to the optical power provided at the start of the progressive optical power. When the progressive optical power region begins above the mostly spherical power region (not shown), the upper edge of the mostly spherical power region causes a discontinuity across the channel of the progressive optical power region.

Figure 14E:
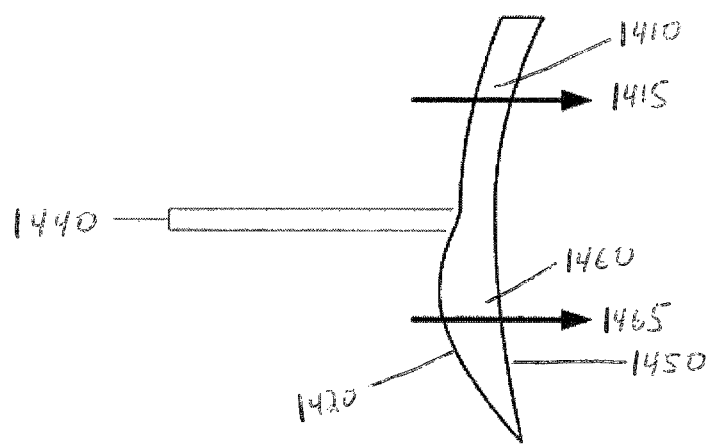
FIG. 14E shows a cross-sectional view of the lens of FIGS. 14A and 14C taken through the center vertical line of the lens.
Figure 14F:
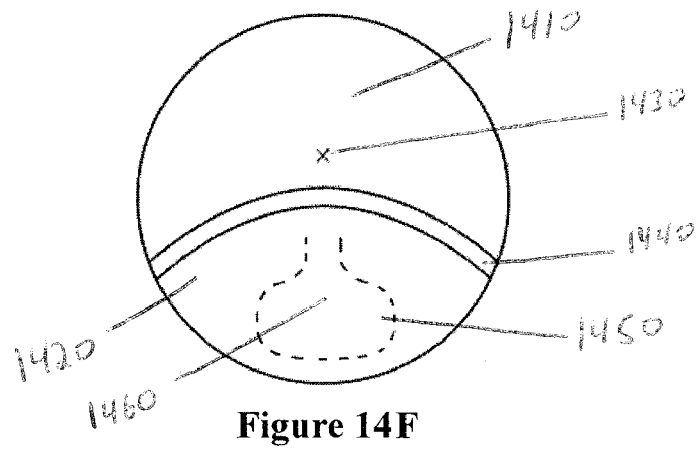
FIG. 14F shows the inventive lens of FIGS. 14A and 14C from the front showing the placement and optical alignment of the optical power regions on the front and back surfaces of the lens.
Figure 14G:
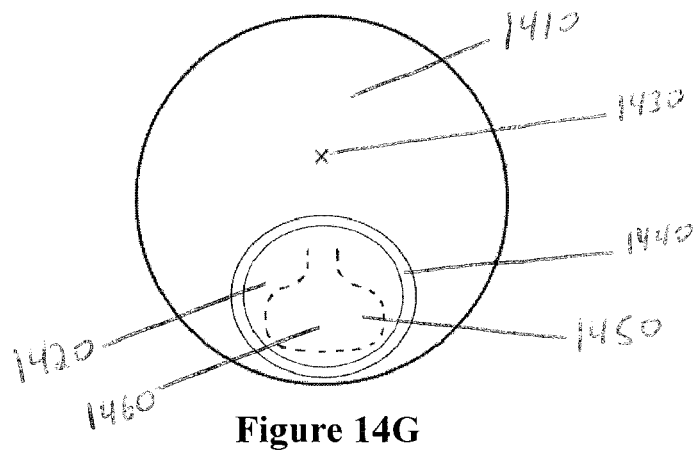
FIG. 14G shows the inventive lens of FIGS. 14B and 14C from the front showing the placement and optical alignment of the optical power regions on the front and back surfaces of the lens.

FIG. 14E shows a cross-sectional view of the lens of FIGS. 14A and 14C taken through the center vertical line of the lens. As can be seen in FIG. 14E, a far distance optical power 1415 is provided in the far distance zone. The mostly spherical power region and the progressive optical power region are aligned to be in optical communication with each other such that the optical power contributed by each region combines in the near distance zone 1460 to provide a total near distance add power 1465 for the user. The progressive optical power region begins below the fitting point and ends at or above the bottom of the lens. FIG. 14F shows the inventive lens from the front showing the placement and optical alignment of the optical power regions of FIGS. 14A and 14C on the front and back surfaces of the lens. FIG. 14G shows the inventive lens from the front showing the placement and optical alignment of the optical power regions of FIGS. 14B and 14C on the front and back surfaces of the lens. As can be seen in both FIGS. 14F and 14G, the progressive optical power region starts at a portion of the mostly spherical power region and is spaced apart and below the discontinuity.

Figure 15A:
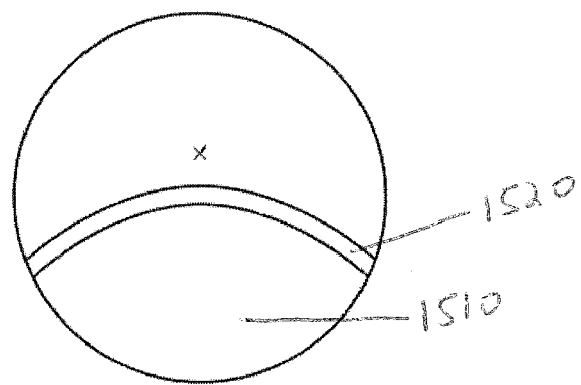
FIG. 15A shows a view of the front surface of a lens according to an embodiment of the present invention having two optical power regions and a blend zone.
Figure 15B:
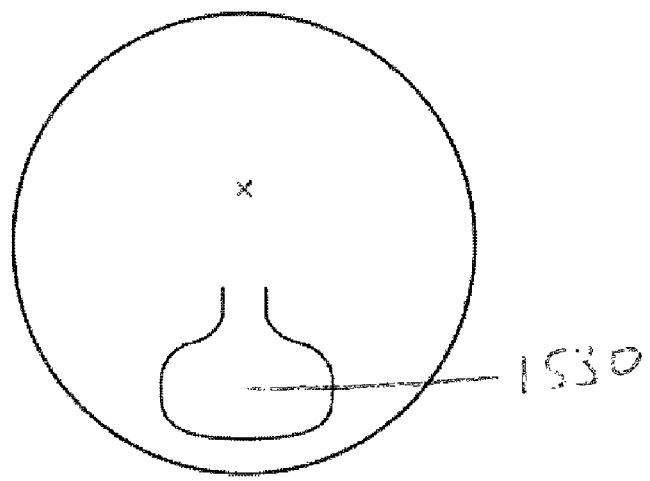
FIG. 15B shows a view of the back surface of the lens of FIG. 15A having a progressive optical power region below a fitting point of the lens.
Figure 15C:
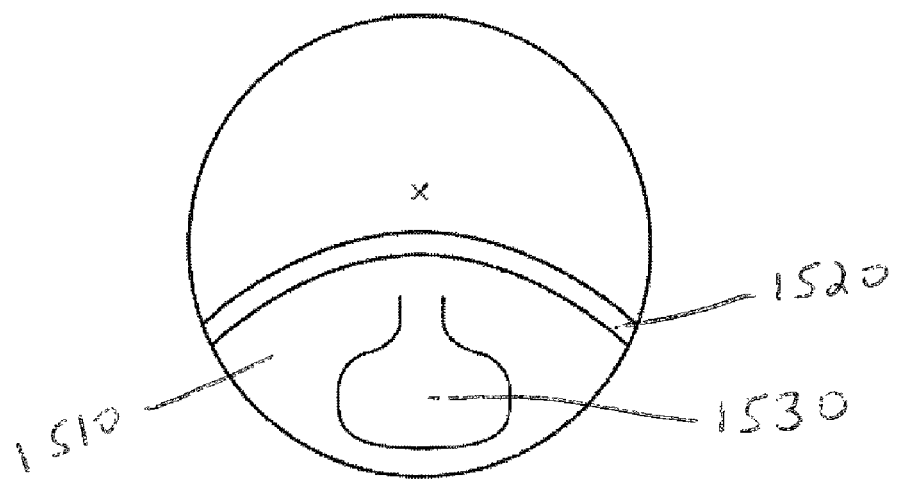
FIG. 15C shows an inventive lens having a surface which is the mathematical combination of the surface of FIG. 15A and the surface of FIG. 15B.

As mentioned above, in some embodiments of the present invention the mostly spherical power region, blend zone, and progressive optical power region may be mathematically combined and located on a single surface of the lens. In an example of such an embodiment a wearer of the lens requires no correction for far distance and +2.25 D for near distance correction. FIG. 15A illustrates a mostly spherical power region 1510 located in the bottom portion of a surface of a lens. The lens has a blend zone 1520 which transitions between the optical power in the far distance zone and the optical power of the mostly spherical power region. By way of example only, in the lens of FIG. 15A, the mostly spherical power region has an optical power of +1.25 D and the far distance zone has a plano optical power. FIG. 15B illustrates a progressive optical power region 1530 located on a surface of a lens. As has been pointed out this could be on the front convex surface, the back concave surface, or on both the front convex surface and the back concave surface. By way of example only, in the lens of FIG. 15B, the progressive optical power region has an add power of +1.00 D. FIG. 15C illustrates a single surface of an inventive lens which is a combination of the surface of the lens shown in FIG. 15A and the surface of the lens shown in FIG. 15B. By way of example only, in the inventive lens in FIG. 15C, the near distance zone optical power is +2.25 D which is a combination of the +1.25 D of optical power contributed by the mostly spherical power region and the +1.00 D of optical power contributed by the progressive optical power region. It should be noted that in FIG. 15C the progressive optical power region is optically aligned to start at a portion of the mostly spherical power region and is spaced apart and below the blend zone.

In some embodiments of the present invention the two surfaces may be combined by adding the geometries of the two surfaces together mathematically thereby creating a new single surface. This new single surface may then be fabricated from a mold that may be produced by free-forming or by diamond-turning. The mold can be used to produce semi-finished lens blanks that can be surfaced by any optical laboratory.

By describing each of the two surfaces in terms of a geometric function in Cartesian coordinates, the surface in FIG. 15A can be mathematically combined with the surface described in FIG. 15B to create the new surface shown in FIG. 15C, which is a combination of the two surfaces.

The surface that defines or produces the mostly spherical power region and blend zone may be divided into discrete equally sized sections. Each section may be described as a localized height or a localized curve relative to a fixed surface or fixed curvature, respectively. Such a surface can be described with the following equation:

$$Z_1(x, y) = \sum_{i=0}^{n_1} \sum_{j=0}^{n_2} S(x_i, y_j)$$

Similarly the surface that defines or produces the progressive optical power region may be divided into discrete equally sized sections that are the same size as the above mentioned sections. Each section may be described as a localized height or a localized curve relative to a fixed surface or fixed curvature, respectively. Such a surface can be described with the following equation:

$$Z_2(x, y) = \sum_{i=0}^{n_1} \sum_{j=0}^{n_2} P(x_i, y_j)$$

If the sections of the two surfaces are the same size, combining sections from each surface is straightforward. The combined surface may then be described by the simple superposition of the two surfaces or:

$$Z_3(x,y) = Z_1(x,y) + Z_2(x,y)$$

Figure 15D:
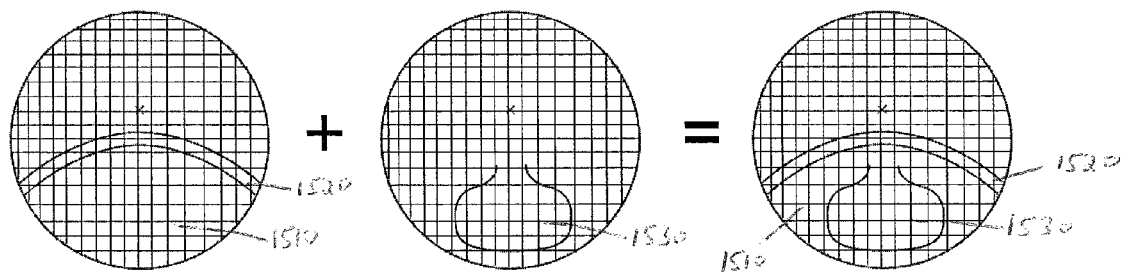
FIG. 15D shows a diagram pictorially explaining how the surfaces of FIG. 15A and 15B are combined to form the surface of FIG. 15C.

This process is illustrated in FIG. 15D.

The size of the sections should be as small as possible to achieve an accurate representation of each surface. Further optimization of the progressive optical power region may be done after the two surfaces are combined, or the progressive optical power region can be pre-optimized for better combination with the mostly spherical power region and blend zone. If desired, the blend zone may not be combined and only the mostly spherical power region and progressive optical power region are combined.

The two surfaces may also be combined by the methods described is U.S. Pat. No. 6,883,916 to Menezes and U.S. Pat. No. 6,955,433 to Wooley, et al., both of which are hereby incorporated by reference in their entirety.

The inventors have discovered the importance of a range of distances that has heretofore never been corrected in the same manner in the ophthalmic arts. The range of distances lies between approximately 29 inches and approximately 5 feet and has been found to be particularly important for tasks such as focusing to the far edge of one's desk. In the prior art, this range of distances has been largely overlooked and has been lumped together in prior art definitions with the category of either far distance or intermediate distance. Therefore, this range of distances has been corrected as part of one of these categories. The inventors refer to this range of distances as a "far-intermediate distance". A new vision zone termed a "far-intermediate distance zone" has been invented to provide for proper focusing ability for this inventive far-intermediate distance. Embodiments of the present invention may include this far-intermediate distance zone and may optimize the optical power in this zone to provide proper focusing ability for a far-intermediate distance. Embodiments of the present invention may include this far-intermediate distance zone and may optimize the location of this zone in the lens to provide for proper ergonomic use of the lens. When this zone is located between the far distance zone and the intermediate distance zone it is termed an "upper far-intermediate distance zone". When this zone is located below the near distance zone it is termed a "lower far-intermediate distance zone".

Typically, prior art multifocal lenses do not provide for proper focusing ability at a far-intermediate distance or provide for only limited focusing ability at a far-intermediate distance. For example, the far distance region or zone of bifocals is prescribed for an individual wearer to allow for focusing ability at a far viewing distance such as optical infinity which is approximately 20 feet or greater. However, it should be noted that in most cases the same far distance optical power will suffice for the wearer when viewing distances of approximately 5 feet or greater. The near distance region or zone of bifocals is prescribed to allow for focusing ability at a near viewing distance of approximately 10 inches to approximately 16 inches. Trifocals allow for proper focusing ability at a far viewing distance, a near viewing distance, and at an intermediate viewing distance (from approximately 16 inches to approximately 29 inches). PALs provide clear continuous vision between a far viewing distance and a near viewing distance. However, because the optical power in a PAL continuously transitions from the far distance zone to the near distance zone, the vertical stability in this transition zone of the PAL is very limited.

Unlike a PAL, the inventive lens disclosed herein may provide for vertical stability in a particular zone or zones of the lens. Vertical stability in a zone may be provided by a step in optical power that may cause a discontinuity. In addition, the inventive lens may provide for a location of the step or steps that is least distracting to a wearer's vision. Also, the inventive lens may provide for forming the step or steps so they are mostly invisible when one looks at the face of a wearer of the lens. Also, the inventive lens may provide for forming the step or steps so the wearer's eyes can comfortably translate over the step or steps when looking from zone to zone such as, for example, when looking from the far distance zone to the near distance zone. Finally, in certain embodiments of the invention the inventive lens provides for continuous uninterrupted focusing ability between approximately 4 to 5 feet and approximately 10 inches to 12 inches from the eye of the wearer with only a single discontinuity which is comfortably transitioned over when the wearer focuses between a far distance object and an object at or less than 4 to 5 feet from the wearer's eye. In still other embodiments of the invention the step in optical power occurs between the far distance zone and the intermediate distance zone whereby the inventive lens allows for continuous uninterrupted focusing ability between approximately 29 inches and approximately 10 inches to 12 inches from the eye of the wearer with only a single discontinuity which is comfortably transitioned over when the wearer focuses between a far distance object and an object at or less than approximately 29 inches from the wearer's eye.

In embodiments of the present invention it may be necessary to align the mostly spherical power region and the progressive optical power region to ensure that the correct total optical power is provided in the far-intermediate zone and in the intermediate distance zone. The far-intermediate distance zone typically has an add power between approximately 20% and approximately 44% of the near distance add power. The intermediate distance zone typically has an add power between approximately 45% and approximately 55% of the near distance add power. It may also be necessary to align and position these regions to create a usable and ergonomically feasible lens for when the wearer's line of sight transitions between the various zones (far distance zone, far-intermediate distance zone, intermediate distance zone, and near distance zone). Lastly, it may also be necessary to design the gradient of optical power that exists between the far distance vision correction and the near distance vision correction to ensure an optimal intermediate distance correction and/or far-intermediate distance correction.

In an embodiment of the present invention, the mostly spherical power region is located between approximately 0 mm and approximately 7 mm below the fitting point. In another embodiment of the present invention, the mostly spherical power region is located between approximately 2 mm and approximately 5 mm below the fitting point. In an embodiment of the present invention, the progressive optical power region starts at a portion of the mostly spherical power region approximately 2 mm to approximately 10 mm below the top edge of the mostly spherical power region. In another embodiment of the present invention, the progressive optical power region starts at a portion of the mostly spherical power region approximately 4 mm to approximately 8 mm below the top edge of the mostly spherical power region. In an embodiment of the present invention, the far-intermediate distance power should start between approximately 3 mm and approximately 4 mm below the fitting point and extend for approximately 4 mm down the channel. In an embodiment of the present invention, the intermediate distance power should start after the far-intermediate distance zone and extend for approximately 3 mm to approximately 4 mm down the channel. The aforementioned measurements are exemplary only, and are not intended to limit the present invention.

If the mostly spherical power region and progressive optical power region are not aligned and positioned properly, the user of the lens will not have proper vision correction in usable portions of the lens. For example, if the mostly spherical power region is located much above the fitting point, the wearer may have too much optical power for far distance viewing when looking straight ahead. As another example, if the low add power progressive optical power region is located too high in the lens, the combined optical power in the intermediate distance zone provided by the mostly spherical power region and the progressive optical power region may be too high for the wearer.

Figure 16:
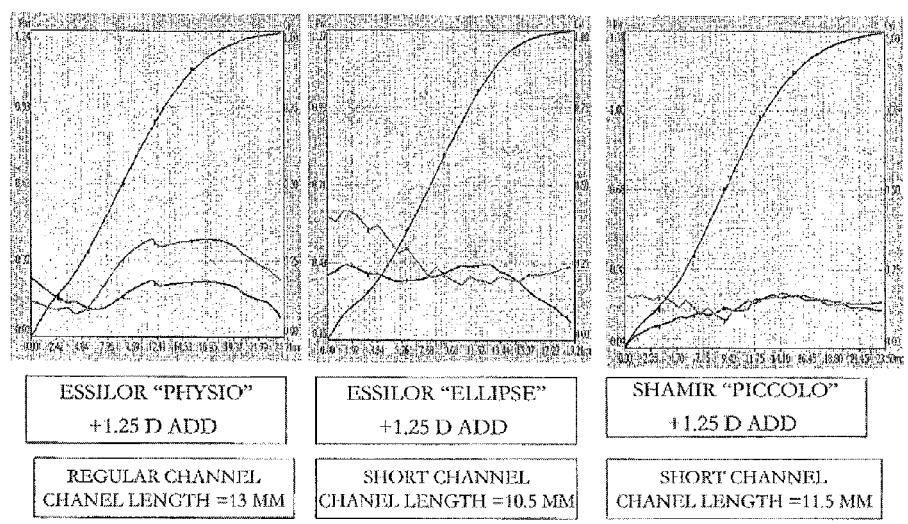
FIG. 16 shows an add power gradient as measured by a Rotlex Class Plus™ trademarked by Rotlex for an Essilor Physio™ lens trademarked by Essilor, an Essilor Ellipse™ lens trademarked by Essilor, and a Shamir Piccolo™ lens trademarked by Shamir Optical having a near distance add power of +1.25 D.

FIG. 16 and FIG. 17 show three conventional PAL designs (the Essilor Physio™ lens trademarked by Essilor, the Essilor Ellipse™ lens trademarked by Essilor, and the Shamir Piccolo™ lens trademarked by Shamir Optical) having a near distance add power of +1.25 D. FIG. 16 shows an add power gradient for the three lenses as measured by a Rotlex Class Plus™. FIG. 17 shows measurements taken every 3 mm from the fitting point down the channel of the add power in the three lenses as measured by a Rotlex Class Plus™ trademarked by Rotlex.

FIG. 18 shows measurements taken every 3 mm from the fitting point down the channel of the add power in three embodiments of the present invention. In these embodiments, the three lenses of FIG. 16 and FIG. 17 are placed in optical communication with a mostly spherical power region having an optical power of +1.00 D. In these embodiments, the progressive optical power region starts at the fitting point and the top edge of the mostly spherical power region is placed just below the fitting point. As can be seen from FIG. 18, the add power of the lenses at 9 mm below the fitting point is too strong. The region of the lens 9 mm below the fitting point would typically be part of the intermediate distance zone. For a +2.25 D near distance add power the intermediate distance add power should be +1.12 D. However, the Essilor Physio™ embodiment has +1.63 D add power at 9 mm from the fitting point, the Essilor Ellipse™ embodiment has +1.82 D add power at 9 mm from the fitting point, and the Shamir Piccolo™ embodiment has +1.68 D add power at 9 mm from the fitting point. Because there is too much add power in the intermediate distance zone, a user of the lens may feel as if his or her eyes are pulling or crossing. This may cause headaches and the user will have to hold objects closer to his or her eyes to focus properly through this zone. Thus, if the optical power, placement, and alignment of the mostly spherical power region and progressive optical power region are not optimized the resulting lens will have one or more of the following: poor vision ergonomics, poor vision comfort, and poor vision clarity.

Figures 19, 20:
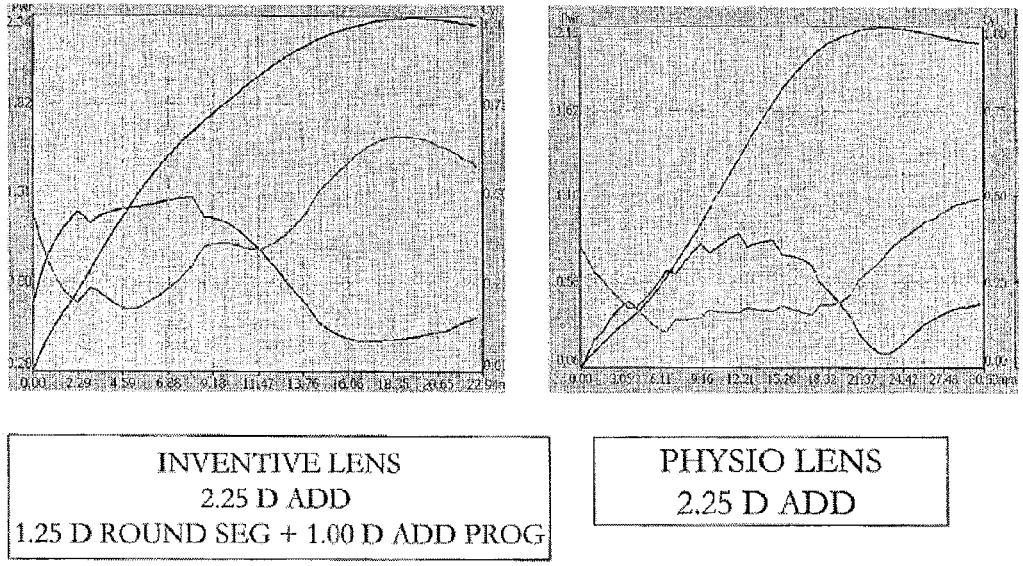
FIG. 19 shows an add power gradient for both an embodiment of an inventive lens on the left and an Essilor Physio™ lens trademarked by Essilor on the right as measured by a Rotlex Class Plus™ trademarked by Rotlex.
FIG. 20 shows measurements taken from the fitting point down the channel of the add power found in the two lenses of FIG. 19 as measured by a Rotlex Class Plus™ trademarked by Rotlex.

As another example, FIG. 19 shows an add power gradient for both an embodiment of an inventive lens on the left and an Essilor Physio™ lens on the right as measured by a Rotlex Class Plus™. Both the inventive lens and the Physio™ lens have an add power of +2.25 D. The inventive lens has a mostly spherical power region having an optical power of +1.25 D and a progressive optical power region having an add power of +1.00 D. The top of the progressive optical power region starts just below the fitting point and the top of the mostly spherical power region is located 4 mm below the fitting point. Thus, there is a region of the lens where only the progressive optical power region contributes increasing optical power before the mostly spherical power region begins to add optical power to the lens. FIG. 20 shows measurements taken every 3 mm from the fitting point down the channel of the add power in the two lenses as measured by a Rotlex Class Plus™. This embodiment of the inventive lens has an add power of +1.60 D at 9 mm from the fitting point compared to that of the Essilor Physio™ which has an add power of +1.10 D at 9 mm from the fitting point. As before, if the optical power, placement, and alignment of the mostly spherical power region and progressive optical power region are not optimized the resulting lens will have poor vision ergonomics, poor vision comfort, and poor vision clarity. This is true even when the correct full add power is provided by the lens as it is at 15 mm below the fitting point in FIGS. 18 and 20.

Therefore, even though these embodiments of the inventive lens have numerous superior attributes compared to state-of-the-art PALs, it should be obvious that such lenses would be rejected by a user. The embodiments of the inventive lens have too much add power in the intermediate distance zone and the optical power gradient from the fitting point to the bottom of the lens is too steep.

By comparing the add power measurements shown in FIG. 18 and FIG. 20 for the Essilor Physio™ lens, it should be apparent that one cannot add a +1.00 D spherical power region to the Essilor Physio™ lens of FIG. 17 and thereby approximate the Essilor Physio™ lens of FIG. 20. It should therefore be apparent that the mostly spherical power region and/or the progressive optical power region must be specifically designed to take into account the gradient of optical power between the far distance zone and near distance zone to provide for a proper intermediate distance correction and/or far-intermediate distance correction.

Figure 21:
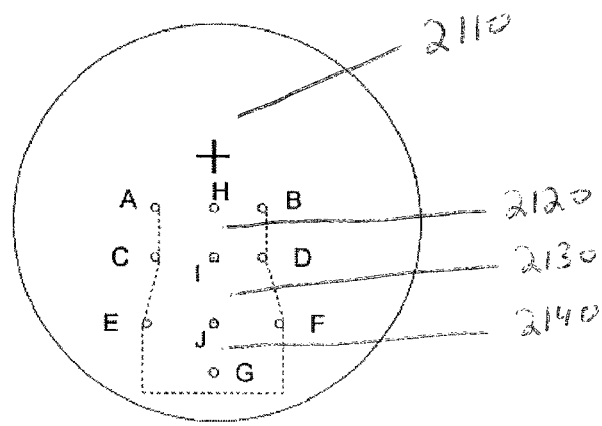
FIG. 21 shows four regions of an inventive lens: a far distance zone, an upper far-intermediate distance zone, an intermediate distance zone, and a near distance zone.

FIG. 21 shows four regions of an inventive lens: a far distance zone 2110, an upper far-intermediate distance zone 2120, an intermediate distance zone 2130, and a near distance zone 2140. These regions are not shown to scale. The upper far-intermediate distance zone may have a height from point H to point I and a width from point A to point B. The intermediate distance zone may have a height from point I to point J and a width from point C to point D. The near distance zone may have a height from point J to point G and a width from point E to point F. In certain embodiments of the present invention the inventive lens may provide proper correction for a wearer for the far distance zone and the near distance zone and provide an optimized gradient of optical power allowing the wearer to see properly at a far-intermediate distance and an intermediate distance. In certain embodiments of the present invention, the lens may have vertical stability of vision in the upper far-intermediate distance zone and/or vertical stability of vision in the intermediate zone. In embodiments of the invention that do not have a far-intermediate zone, the intermediate distance zone may have increased vertical stability of vision.

An additional far-intermediate distance region may be provided below the near distance zone. In such an embodiment, this region may be referred to as the "lower" far-intermediate distance zone and the far-intermediate distance region between the far distance region and the intermediate distance region may be referred to as the "upper" far-intermediate distance region. The upper and lower far-intermediate zones may have the same optical power. The lower far-intermediate zone may be included in an inventive lens design to allow the presbyopic wearer to see his or her feet or the floor more easily when looking downwards. This may provide additional safety when walking up and down stairs.

Embodiments of the present invention may include one or more discontinuities between regions of the lens. The discontinuity may be caused by a discontinuous surface or by discontinuous optical power between two different regions of the lens. The discontinuity may be caused by a step up or a step down in optical power. A discontinuity is defined by any change in a surface of a lens or in an optical power of the lens that results in a perceived image break when looking through the lens. By way of example only, the inventors have fabricated a variety of inventive lenses and have found that it is difficult to perceive an image break when a lens has an optical power discontinuity of less than approximately 0.10 D when the lens is positioned at a distance from the eye consistent with how spectacle lenses are typically worn. However, optical power discontinuities larger than approximately 0.10 D to 0.12 D can be visually detected in most cases. Furthermore, such optical power discontinuities that can be perceived by a wearer of the lens can be disturbing to the wearer's vision during certain visual tasks such as, for example, viewing a computer screen. It should be noted that the optical power values stated above for a discontinuity are only examples and a discontinuity is any change in a surface or optical power of a lens that results in the ability to perceive an image break when looking through the lens.

The inventors have further established that certain discontinuities are more noticeable and/or disturbing than others. Embodiments of the invention may therefore include one or more discontinuities that are less noticeable and/or less disturbing. The inventors have found that a discontinuity between the far distance zone and the upper far-intermediate distance zone of the lens is visually tolerated by a user far better than a discontinuity located within the intermediate distance zone, the near distance zone, or between the intermediate distance zone and the near distance zone. In addition, the inventors have established that the narrower the width of a blend zone which blends at least a portion of the discontinuity, the better the eye transitions over the discontinuity due to the fact that the eye transitions more quickly over any image break or blur created by the blend zone. Although this would seem to indicate that the discontinuity should therefore not be blended, this must be balanced by the positive cosmetic effect of blending the discontinuity to create a nearly invisible discontinuity.

Figure 25:
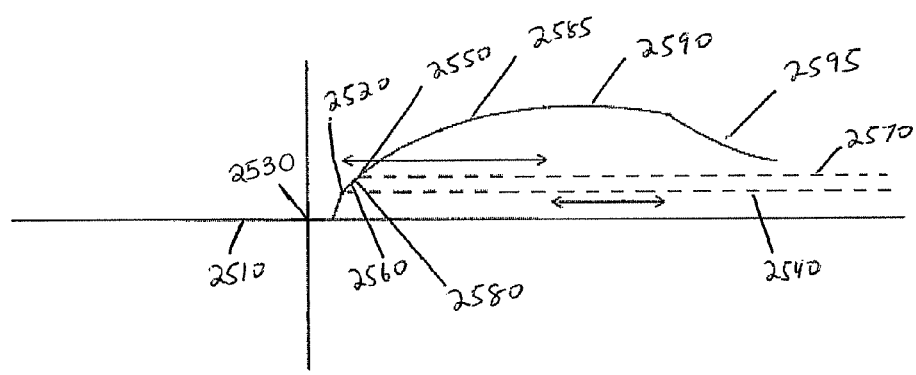
Figure 26:
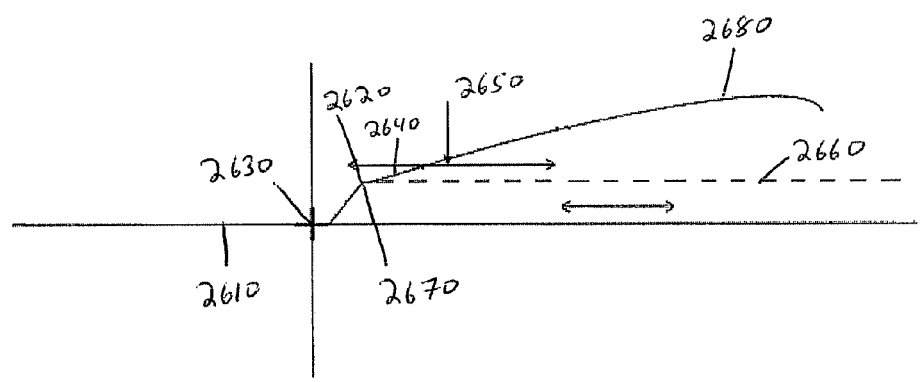

Embodiments of the inventive lens disclosed herein are comprised of one or more discontinuities, wherein a discontinuity may be caused by a step up in optical power of +0.12 D or more. Inventive embodiments disclosed herein may have a single discontinuity which is at least partially blended by a blend zone having a width less than approximately 2.0 mm or between approximately 1.0 mm and 0.5 mm. Blend zones of this width can be generated by diamond turning. However, in other embodiments of the invention the discontinuity is not blended. In embodiments of the invention the discontinuity may be created by a step up in optical power of over approximately +0.25 D and in most cases over approximately +0.50 D. The step up in optical power and thus the discontinuity is usually, but not always, located between the far distance zone of the inventive lens and the far-intermediate distance zone. Alternatively, when the inventive lens does not have a far-intermediate distance zone, the discontinuity is usually located between the far distance zone and the intermediate distance zone of the lens. FIGS. 25 and 26 show such a step up in optical power prior to the start of the progressive optical power region.

Figure 22:
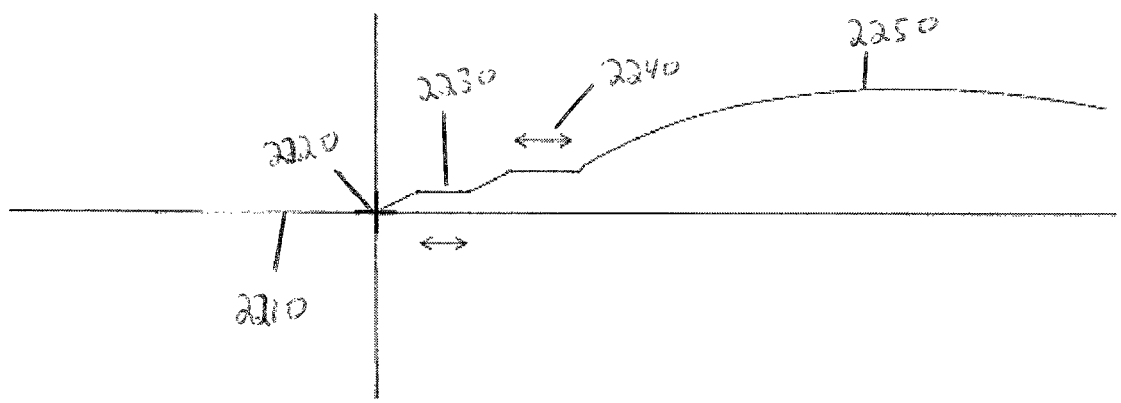
FIGS. 22-23 show the optical power along the center vertical mid-line of embodiments of the present invention including a progressive optical power region connecting the far distance zone to the near distance zone.
Figure 23:
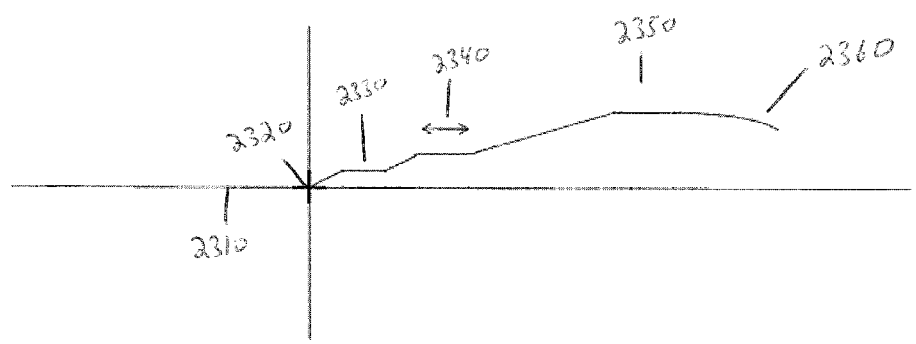

All embodiments of the invention allow for the ability to have three usable zones of optical power: a far distance zone, an intermediate distance zone, and a near distance zone. Embodiments of the present invention may also provide for the ability to have a fourth zone, an upper far-intermediate distance zone and, in some embodiments, a fifth zone, a lower far-intermediate distance zone. Embodiments of the present invention may:

a) Increase the length of the channel to allow for an additional 2 mm to 3 mm plateau of optical power to provide for upper far-intermediate distance correction. Such an optical power zone may be useful when using one's computer or looking to the edge of one's desk. It should be noted that increasing the channel length may not be possible depending on the vertical dimensions of the eyeglass frame which will house the lens.

b) Increase the length of the channel to allow for an additional 2 mm to 3 mm plateau of optical power to provide for lower far-intermediate distance correction. Such an optical power zone may be useful when looking at one's feet or the floor when climbing up or down stairs. It should be noted that increasing the channel length may not be possible depending on the vertical dimensions of the eyeglass frame which will house the lens.

c) Utilize one or more discontinuities. The one or more discontinuities may be caused by one or more steps in optical power, wherein a step is either a step up or a step down in optical power. Because a discontinuity uses very little, if any, lens real estate to step up or down the optical power, the channel can be designed to allow for a plateau of optical power without extending the length of the channel. It is important to note that the larger the step in optical power, the more real estate in the lens can be provided for an optical power plateau. In embodiments of the invention, a plateau of optical power is provided after a discontinuity and provides for a far-intermediate distance correction. This is accomplished without adding to the length of the channel. FIG. 22 shows an embodiment of the invention having two plateaus of optical power; 2230 and 2240 and FIG. 23 shows an embodiment of the invention having three plateaus of optical power; 2330, 2340, and 2350.

d) Keep the length of the channel the same, but ramp up the optical power more quickly between the various zones of optical power. It should be noted that this usually results in problems with vision comfort and eye fatigue of the wearer.

e) Use a step down in optical power immediately below the near distance zone to allow for lower far-intermediate distance zone. It should be noted that a lower far-intermediate distance zone may only be possible if there is enough lens real estate below the near distance portion of the lens.

FIG. 22 shows the optical power along the center vertical mid-line of an embodiment of the present invention including a progressive optical power region connecting the far distance zone to the near distance zone. The figure is not drawn to scale. The optical power in the far distance zone is shown as plano and is therefore represented by the x-axis 2210. The progressive optical power region begins at the fitting point of the lens 2220. Alternatively, the progressive optical power region may begin below the fitting point. Although the optical power of the progressive optical power region increases over the length of the channel, the progressive optical power region may provide for two plateaus of optical power within the channel. The first plateau 2230 provides an upper far-intermediate distance correction and the second plateau 2240 provides an intermediate distance correction. Alternatively, the progressive optical power region provides for a single plateau of optical power which provides either an intermediate distance correction or a far-intermediate distance correction. The first plateau of optical power may have a vertical length along the channel between approximately 1 mm and approximately 6 mm or between approximately 2 mm and approximately 3 mm. However, in all cases, a plateau of optical power has a vertical length of at least approximately 1 mm. After the first plateau of optical power the optical power contributed by the progressive optical power region increases until a second plateau of optical power. The second plateau of optical power may have a vertical length along the channel between approximately 1 mm and approximately 6 mm or between approximately 2 mm and approximately 3 mm. After the second plateau of optical power the optical power contributed by the progressive addition region increases until the total near distance optical power is reached at 2250. After the near distance optical power is achieved the optical power contributed by the progressive optical power region may begin to decrease. If the optical power decreases to between approximately 20% to approximately 44% of the add power in the near distance zone, a lower far-intermediate zone may be provided.

FIG. 23 shows the optical power along the center vertical mid-line of an embodiment of the present invention including a progressive optical power region connecting the far distance zone to the near distance zone. The figure is not drawn to scale. The optical power in the far distance zone is shown as plano and is therefore represented by the x-axis 2310. The progressive optical power region begins at the fitting point of the lens 2320. Alternatively, the progressive optical power region may begin below the fitting point. Although the optical power of the progressive optical power region increases over the length of the channel, the progressive optical power region may provide for three plateaus of optical power within the channel. The first plateau 2330 provides an upper far-intermediate distance correction, the second plateau 2340 provides an intermediate distance correction, and the third plateau 2350 provides a near distance correction. The first plateau of optical power may have a vertical length along the channel between approximately 1 mm and approximately 6 mm or between approximately 2 mm and approximately 3 mm. However, in all cases, a plateau of optical power has a vertical length of at least approximately 1 mm. After the first plateau of optical power the optical power contributed by the progressive optical power region increases until a second plateau of optical power. The second plateau of optical power may have a vertical length along the channel between approximately 1 mm and approximately 6 mm or between approximately 2 mm and approximately 3 mm. After the second plateau of optical power the optical power contributed by the progressive optical power region increases until a third plateau of optical power. The third plateau of optical power may have a vertical length along the channel between approximately 1 mm and approximately 6 mm or between approximately 2 mm and approximately 3 mm. After the near distance optical power is achieved at 2360 the optical power contributed by the progressive optical power region may begin to decrease. If the optical power decreases to between approximately 20% to approximately 44% of the add power in the near distance zone, a lower far-intermediate zone may be provided.

Figure 24:
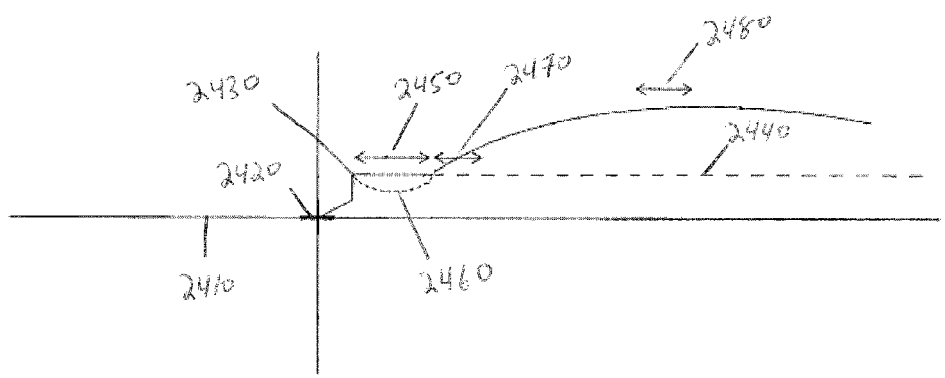
FIG. 24-26 shows the optical power along the center vertical mid-line of embodiments of the present invention including a mostly spherical power region, a discontinuity, and a progressive optical power region connecting the far distance zone to the near distance zone.

FIG. 24 shows the optical power along the center vertical mid-line of an embodiment of the present invention including a mostly spherical power region, a discontinuity, and a progressive optical power region connecting the far distance zone to the near distance zone. The figure is not drawn to scale. The optical power in the far distance zone is shown as plano and is therefore represented by the x-axis 2410. The progressive optical power region begins at or near the fitting point of the lens 2420. The discontinuity 2430 may be caused by the mostly spherical power region, which causes a step in optical power, and contributes an optical power 2440. The progressive optical power region may start above the discontinuity. In this case, the start of the progressive optical power region may be located by measuring the optical power in the far distance zone and then locating an area or region of the lens above the discontinuity where the optical power of the lens begins to gradually increase in plus optical power or reduce in minus optical power. The difference between the optical power just before the discontinuity and just after the discontinuity is referred to as a "step in optical power". A "step up in optical power" occurs if the optical power increases from before the discontinuity to after the discontinuity. A "step down in optical power" occurs if the optical power decreases from before the discontinuity to after the discontinuity. Thus, if the progressive optical power region starts above the discontinuity, immediately before the discontinuity the total optical power in the lens is the optical power of the progressive optical power region and the far distance zone and immediately after the discontinuity the total optical power in the lens is the optical power caused by the step in optical power and the optical power of the progressive addition region and far distance zone. Alternatively, the progressive optical power region may start below the discontinuity such that immediately before the discontinuity the total optical power in the lens is the far distance optical power and after the discontinuity once the progressive optical power region starts the total optical power in the lens is the optical power caused by the step in optical power and the optical power of the progressive addition region and the far distance zone. The progressive optical power region may begin immediately after the discontinuity. Alternatively, the progressive optical power region may begin 1 or more millimeters from the discontinuity thereby creating a plateau of optical power 2450 that may be useful for intermediate distance viewing or upper far-intermediate distance viewing. In some embodiments of the present invention the progressive optical power region may have a negative optical power 2460 such that the region decreases the total optical power in the lens before having a positive optical power that increases the total optical power in the lens. For example, the optical power caused by the step in optical power may be higher than the optical power needed for proper far-intermediate distance viewing. In this case, a portion of the progressive optical power region at and immediately after the discontinuity may decrease the optical power of the lens to provide a proper upper far-intermediate distance correction. The progressive optical power region may then increase in optical power to provide a proper intermediate distance correction 2470. The optical power of the progressive optical power region may further increase until the full near distance optical power 2480 after which it may begin to decrease again. If the optical power decreases to between approximately 20% to approximately 44% of the add power in the near distance zone, a lower far-intermediate zone may be provided.

In embodiments of the invention in which the progressive optical power region begins above the discontinuity, the optical power contributed by the progressive optical power region may initially be zero or negative. The discontinuity may be caused by a step in optical power. The optical power caused by the step in optical power may be approximately equal to the optical power needed for proper intermediate distance correction or for far-intermediate distance correction. Therefore, if the initial optical power contributed by the progressive optical power region is zero, the combined optical power after the discontinuity will be the proper intermediate distance correction or far-intermediate distance correction. Similarly, the optical power caused by the step in optical power may be larger than the optical power needed for proper intermediate distance correction or for far-intermediate distance correction. Therefore, if the initial optical power contributed by the progressive optical power region is negative, the combined optical power after the discontinuity will be the proper intermediate distance correction or far-intermediate distance correction. In either case, if the progressive optical power region initially contributed a positive optical power, the combined optical power after the discontinuity will be too strong. This was proven to be the case in FIGS. 16-20. Furthermore, it should be noted that if the step in optical power causes a higher optical power than needed for proper intermediate distance correction or for far-intermediate distance correction, a lower add power progressive optical power region may be used thereby improving the optical characteristics of the lens. It should be noted that the lower the progressive optical power region's optical power, the less unwanted astigmatism and distortion will be added to the final lens.

Alternatively, in embodiments of the invention in which the progressive optical power region begins above the discontinuity, the optical power contributed by the progressive optical power region may initially be positive. In these embodiments, the optical power caused by the step in optical power is reduced to be less than the optical power needed for proper intermediate distance correction or for proper far-intermediate distance correction. Therefore, if the initial optical power contributed by the progressive optical power region is positive, the combined optical power after the discontinuity will be the proper intermediate distance correction or far-intermediate distance correction. However, it should be noted that in this embodiment the unwanted astigmatism and distortion are greater in the final lens than an embodiment in which the mostly spherical region's optical power is equal to or greater than the optical power contributed by the progressive optical power region.

FIG. 25 shows the optical power along the center vertical mid-line of an embodiment of the present invention including a mostly spherical power region, a discontinuity, and a progressive optical power region connecting the far distance zone to the near distance zone. The figure is not drawn to scale. The optical power in the far distance zone is shown as plano and is therefore represented by the x-axis 2510. The discontinuity 2520 may be located below the fitting point 2530, for example, approximately 3 mm below the fitting point. The discontinuity may be caused by the mostly spherical power region, which causes a step in optical power, and contributes an optical power 2540. The progressive optical power region may start at a portion of the mostly spherical power region, for example, immediately after the discontinuity or shortly thereafter at 2550. The mostly spherical power region may have an "aspheric portion" 2560 within approximately 3 mm to 5 mm of the discontinuity. After this portion, the mostly spherical power region may be substantially spherical. The combination of the progressive optical power region's optical power and the mostly spherical power region's aspheric portion's optical power may form a combined progressive optical power region having an optical power that increases immediately after the discontinuity in a mostly continuous manner as opposed to a sharp step up in optical power. The net optical effect is that the step in optical power is less than the full optical power 2570 provided by the mostly spherical power region. The aspheric portion and the progressive optical power region allow the full optical power of the mostly spherical power region to be achieved gradually after the discontinuity. The aspheric portion may provide a proper upper far-intermediate distance correction 2580. Alternatively, the progressive optical power region may contribute additional optical power to provide the proper upper far-intermediate distance correction. The progressive optical power region may then increase in optical power to provide a proper intermediate distance correction 2585. Alternatively, only a proper far-intermediate distance correction may not be provided. The optical power of the progressive optical power region may further increase until the full near distance optical power 2590 after which it may begin to decrease again. In embodiments of the present invention a lower far-intermediate distance correction 2595 may be provided by a step down in optical power after the near distance zone. Alternatively, the lower far-intermediate distance zone may be provided by the progressive optical power region contributing negative optical power which decreases the optical power in the lens.

FIG. 26 shows the optical power along the center vertical mid-line of an embodiment of the present invention including a mostly spherical power region, a discontinuity, and a progressive optical power region connecting the far distance zone to the near distance zone. The figure is not drawn to scale. The optical power in the far distance zone is shown as plano and is therefore represented by the x-axis 2610. The discontinuity 2620 may be located below the fitting point 2630 between the far distance zone and the upper far-intermediate distance zone 2640. Alternatively, the discontinuity may be located below the fitting point between the far distance zone and the intermediate distance zone 2650. The discontinuity may be caused by the mostly spherical power region, which causes a step in optical power, and contributes an optical power 2660. The step up in optical power may be equal to the optical power needed for far-intermediate distance correction. Alternatively, the step up in optical power may be equal to the optical power needed for intermediate distance correction. The progressive optical power region may start at a portion of the mostly spherical power region, for example, immediately after the discontinuity or shortly thereafter at 2670. If the progressive optical power region begins below the discontinuity, a plateau of optical power may then be provided for either the upper far-intermediate distance zone or for the intermediate distance zone. The progressive optical power region continues until the full near distance optical power 2680 after which it may contribute negative optical power that decreases the optical power in the lens. If the optical power decreases to between approximately 20% to approximately 44% of the add power in the near distance zone, a lower far-intermediate zone may be provided. In some embodiments of the present invention, the lens may include plateaus of optical power for any of the distance zones.

In an embodiment of the invention the lens may provide +2.00 D near add power. The lens may include a buried mostly spherical power region having an optical power of +1.00 D that is aligned so that the top edge of the mostly spherical power region is aligned approximately 3 mm below the fitting point of the lens. The lens may have a progressive optical power surface having a progressive optical power region located on the convex external surface of the lens. Alternatively, the progressive optical power surface could be located on the concave surface of the lens, split between both external surfaces of the lens, or buried within the lens. The progressive optical power region has an initial optical power of zero which increases to a maximum optical power of +1.00 D. The progressive optical power region is aligned so that the start of its channel which has zero optical power begins approximately 10 mm below the fitting point of the lens. In other words, the progressive optical power region is aligned so that the start of its channel is approximately 7 mm below the discontinuity caused by the step up in optical power caused by the buried spherical power region. In this inventive embodiment, there is no far-intermediate distance zone found in the inventive lens. However, the intermediate distance zone has a minimum of approximately 7 mm of vertical stability of vision which is far greater than any PAL lens commercially available. As can be readily understood, the combined optical power of the progressive optical power and the mostly spherical power region does not begin until after approximately 7 mm below the top edge of the mostly spherical power region. Thus, the optical power from approximately 3 mm below the fitting to approximately 10 mm below the fitting point is the +1.00 D optical power which is provided by the mostly spherical power region. This optical power is 50% of the near distance add power and therefore provides proper intermediate distance correction.

In still another embodiment of the invention, the may provide +2.50 D near add power. The lens may have a mostly spherical power region having an optical power of +1.25 D which is free formed on the concave back toric/astigmatic correcting external surface of the lens that is aligned so that the top edge of the mostly spherical power region is approximately 4 mm below the fitting point of the lens. The lens may have a progressive optical power region located on the front convex surface of the lens and having an initial optical power of zero which increases to a maximum optical power of +1.25 D. The progressive optical power region is aligned so that the start of its channel begins approximately 10 mm below the fitting point of the lens. In other words, the progressive optical power region is aligned so that the start of its channel is approximately 6 mm below the discontinuity caused by the step up in optical power caused by the buried spherical power region. In this inventive embodiment, there is no far-intermediate distance zone found in the inventive lens. However, the intermediate distance zone has a minimum of approximately 6 mm of vertical stability of vision which is far greater than any PAL lens commercially available. As can be readily understood, the combined optical power of the progressive optical power and the mostly spherical power region does not begin until after approximately 6 mm below the top edge of the mostly spherical power region (the top edge of the mostly spherical power region being the location of the discontinuity). Thus, the optical power from approximately 4 mm below the fitting to approximately 10 mm below the fitting point is the +1.25 D optical power which is provided by the mostly spherical power region. This optical power is 50% of the near distance add power and therefore provides proper intermediate distance correction.

In an embodiment of the invention the lens may provide +2.25 D near add power. The lens may include a buried mostly spherical power region having an optical power of +0.75 D that is aligned so that the top edge of the mostly spherical power region is aligned approximately 3 mm below the fitting point of the lens. The lens may have a progressive optical power surface having a progressive optical power region located on the convex external surface of the lens. Alternatively, the progressive optical power surface could be located on the concave surface of the lens, split between both external surfaces of the lens, or buried within the lens. The progressive optical power region has an initial optical power of zero which increases to a maximum optical power of +1.50 D. The progressive optical power region is aligned so that the start of its channel which has zero optical power begins approximately 7 mm below the fitting point of the lens. In other words, the progressive optical power region is aligned so that the start of its channel is approximately 4 mm below the discontinuity caused by the step up in optical power caused by the buried spherical power region. In this inventive embodiment, there is a far-intermediate distance zone found in the inventive lens. The far-intermediate distance zone has a minimum of approximately 4 mm of vertical stability of vision. No commercially available PAL has a far-intermediate distance zone or a far-intermediate distance zone having such a long vertical stability of vision. As can be readily understood, the combined optical power of the progressive optical power and the mostly spherical power region does not begin until after approximately 4 mm below the top edge of the mostly spherical power region. Thus, the optical power from approximately 3 mm below the fitting to approximately 7 mm below the fitting point is the +0.75 D optical power which is provided by the mostly spherical power region. This optical power is 33.33% of the near distance add power and therefore provides proper far-intermediate distance correction.

It should be pointed out that the above embodiments are provided as examples only and are not meant to limit the distances from the fitting point for the alignment of the progressive optical power region or the mostly spherical power region. In addition the optical powers given in the examples are also not meant to be limiting. Further, the location of a region being on the surface of the lens, split between surfaces of the lens, or buried within the lens should not be construed as limiting. Finally, while certain embodiments above may teach the absence of a far-intermediate distance zone, the far-intermediate distance zone can be included by altering the alignment and optical powers provided by each region.

Figure 27A:
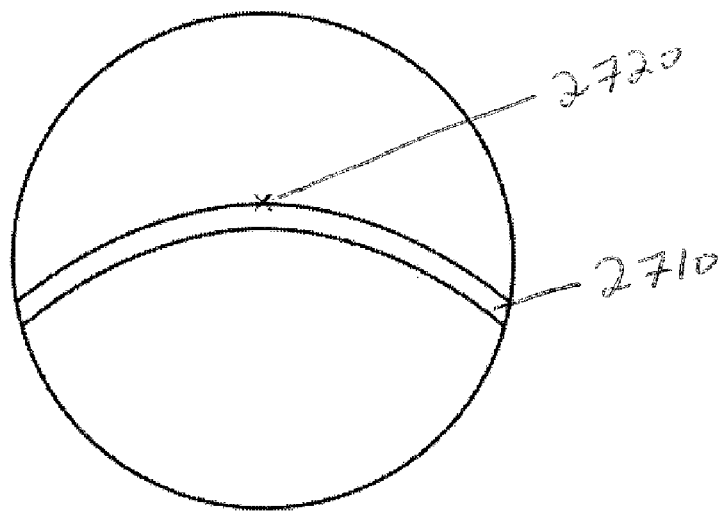
FIGS. 27A-27C show embodiments of the present invention having a blend zone with a substantially constant width located at or below a fitting point of the lens.
Figure 27B:
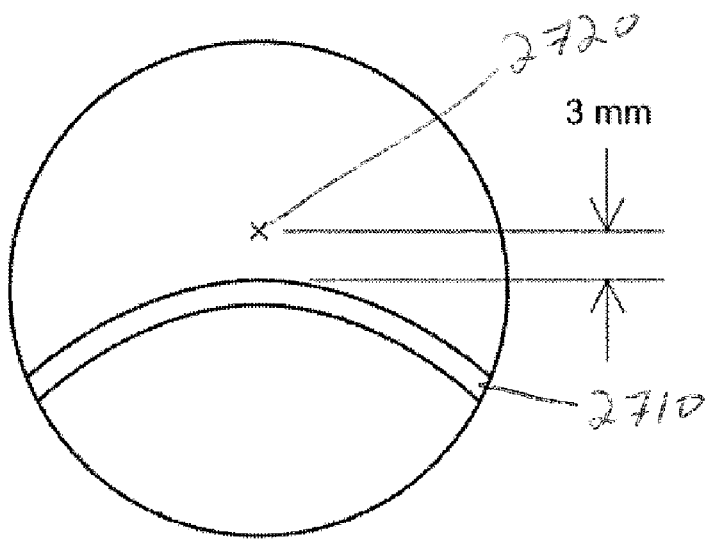
Figure 27C:
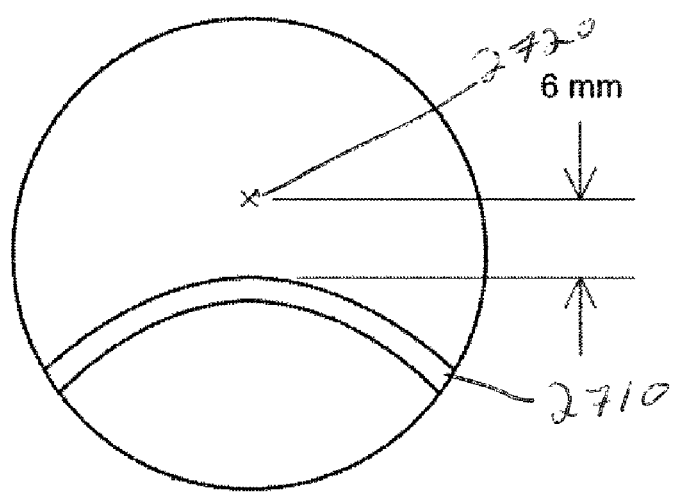
Figure 28A:
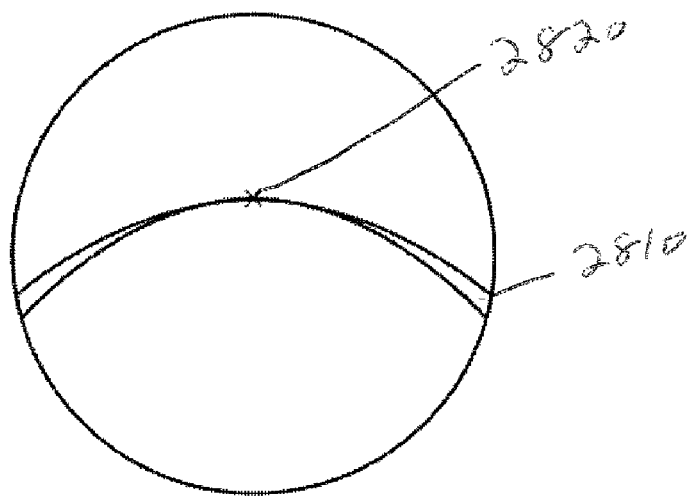
FIGS. 28A-28C shows embodiments of the present invention having a blend zone including a portion with a width of substantially 0 mm (thereby providing a transition in this portion similar to a lined bifocal) located at or below a fitting point of the lens.
Figure 28B:
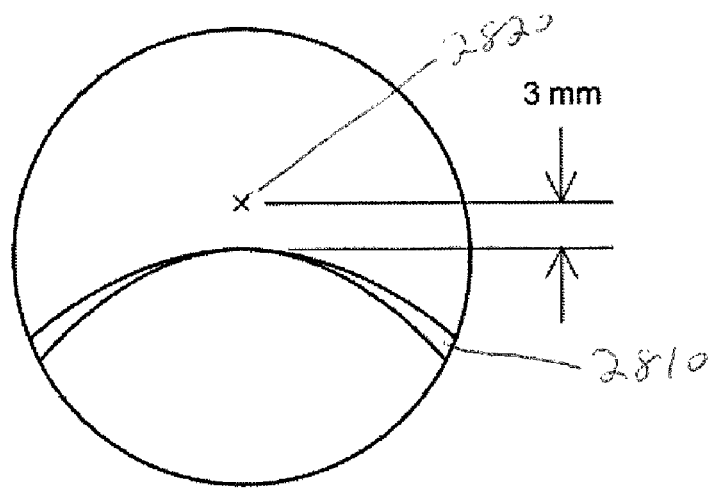
Figure 28C:
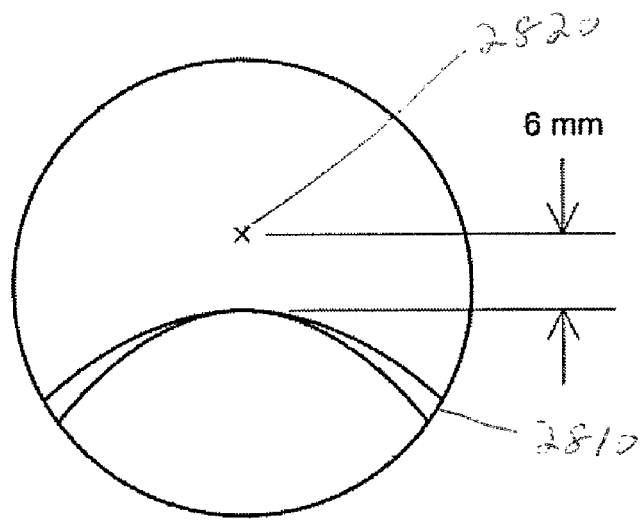

In certain embodiments of the invention a blend zone transitions the optical power between at least a portion of the mostly spherical power region and the far distance zone. FIGS. 27A-27C show embodiments of the present invention having a blend zone 2710 with a substantially constant width located at or below a fitting point 2720. FIGS. 28A-28C shows embodiments of the present invention having a blend zone 2810 including a portion with a width of substantially 0 mm (thereby providing a transition in this portion similar to a lined bifocal) located at or below a fitting point 2820. FIG. 27A and FIG. 28A show the top edge of the blend zone located at the fitting point. FIG. 27B and FIG. 28B show the top edge of the blend zone located 3 mm below the fitting point. FIG. 27C and FIG. 28C show the top edge of the blend zone located 6 mm below the fitting point. Portions of blend zone 2710 and 2810 may be less than approximately 2.0 mm wide and may be between approximately 0.5 mm wide and approximately 1.0 mm wide. It should be noted, that the invention contemplates using a blend zone having a width between approximately 0.1 mm and approximately 1.0 mm. FIG. 28A further shows a central region of the blend zone corresponding to the location of the fitting point has a width between approximately 0.1 mm and approximately 0.5 mm. FIG. 28C shows blend 2810 reducing in width to having no blend in the central region of the blend zone.

The mostly spherical power region and the far distance zone each have an optical power that may be defined by a specific optical phase profile. To create a blend zone of a given width, a phase profile is generated that, in certain embodiments of the invention, matches the value and first spatial derivative of the phase profile of a first optical power region at the start of the blend zone and matches the value and first spatial derivative of the phase profile of a second optical power region at the end of the blend zone. In other embodiments of the invention the start and end of the blend zone phase profile match the value as well as the first and second spatial derivatives of the phase profiles of the first and second optical power regions, respectively. In either case, the phase profile of the blend zone may be described by one or more mathematical functions and/or expressions that may include, but are not limited to, polynomials of second order or higher, exponential functions, trigonometric functions, and logarithmic functions. In certain embodiments of the invention the blend zone is diffractive, in other embodiments of the invention the blend zone is refractive and in still other embodiments of the invention the blend zone has both refractive and diffractive sub-zones.

In some embodiments of the present invention in order for the lens to provide high quality vision, the width of the blend zone must be quite narrow. The blend zone must be narrow to allow the wearer's eye to traverse the blend zone quickly as the wearer's line of sight switches between a far distance focus and an intermediate distance or near distance focus. For example, the width of the blend zone may be less than approximately 2.0 mm, less than approximately 1.0 mm, or less than approximately 0.5 mm. Fabrication of such a narrow blend zone is very difficult using conventional ophthalmic lens fabrication techniques. For example, current state-of-the-art single point, free-forming ophthalmic surface generation only permits blend zones having a width in excess of approximately 0.5 mm. Furthermore, these methods provide little or no control over the exact shape of the blend zone profile. The generation of conventional glass mold tooling for casting lenses from liquid monomer resins is also limited, as glass cannot be single point machined and must be worked with a grinding process where all fine surface features would be lost.

Currently, the only method available to generate lenses with a narrow blend zone having a known and well-controlled profile in an economically feasible manner is the single point diamond turning of metal lens molds. In such a method the diamond tooling equipment is outfitted with either slow or fast tool servo capabilities, both of which are well-known in the art. Such molds can be generated, by way of example only, in materials such as electrolytic Ni or CuNi and may be used in either a liquid monomer resin casting process or a thermoplastic injection molding process.

Each of the above inventive embodiments can be fabricated using diamond turning, free forming, surface-casting, whole-lens casting, laminating, or molding (including injection molding). It has been found that in embodiments without a blend zone, diamond turning provides for the sharpest discontinuity and the best fidelity. In most, but not all cases, molds are diamond turned from metal such as, by way of example only, nickel coated aluminum or steel, or copper nickel alloys. Fabrication methods or techniques needed to produce the steps in optical power are known in the industry and consist, by way of example only, of diamond turning molds or inserts and then casting or injection molding the lens, diamond turning the actual lens, and free forming.

In an embodiment of the present invention, by utilizing state-of-the-art free-forming fabrication techniques it is possible to place the toric surface that corrects the wearer's astigmatic refractive error on the same surface of the lens as the mostly spherical power region. When these two different surface curves are generated by free-forming it is then possible to place the progressive optical power region on the opposite surface of the lens. In this case the progressive optical power region is molded and pre-formed on one surface of the semi-finished blank and the combined astigmatic correction and spherical power region is provided by way of free-forming the opposite unfinished surface of the semi-finished blank.

In some embodiments of the present invention, the mostly spherical power region is wider than the narrowest portion of the channel bounded by an unwanted astigmatism that is above approximately 1.00 D. In other embodiments of the present invention, the mostly spherical power region is wider than the narrowest portion of the channel bounded by an unwanted astigmatism that is above approximately 0.75 D.

In some embodiments of the present invention the mostly spherical power region may be substantially spherical or may be aspheric as well; for example, to correct for astigmatism. The mostly spherical power region may also have an aspheric curve or curves placed to improve the aesthetics of the lens or to reduce distortion. In some embodiments of the present invention, the inventive multifocal lens is static. In other embodiments of the present invention, the inventive multifocal lens is dynamic and the mostly spherical power region is produced dynamically by, for example, an electro-active element. In some embodiments of the present invention, the mostly spherical power region is an embedded diffractive element such as a surface relief diffractive element.

The invention contemplates the production of semi-finished lens blanks where one finished surface comprises the mostly spherical power region, far distance zone and blend zone, and the other surface is unfinished. The invention also contemplates the production of semi-finished lens blanks where one finished surface comprises the progressive optical power region, and the other surface is unfinished. The invention also contemplates that for certain prescriptions a finished lens blank is produced. It should also be noted that the invention contemplates optimizing the progressive optical power region relative to the mostly spherical power region to optimize the level of unwanted astigmatism, the channel length, and the channel width. In addition, the invention contemplates optimizing the blend zone, if desired, to further reduce the unwanted astigmatism found in the blend zone. Furthermore, the invention allows for any lens materials to be used whether plastic, glass, resin, or a composite. The invention also contemplates the use of any optically useful index of refraction. The invention also allows for all coatings and lens treatments that would normally be used on ophthalmic lenses such as, by way of example only, a hard scratch resistant coating, an anti-refraction coating, a cushion coating, and a self-cleaning Teflon coating. Finally, the invention provides for being fabricated by techniques known in the art including, but not limited to, surfacing, free-forming, diamond turning, milling, stamping, injection molding, surface casting, laminating, edging, polishing, and drilling.

It should be further noted that the invention contemplates being used with contact lenses and spectacle lenses.

In order to more clearly show the superiority of the inventive multifocal lens over conventional state-of-the-art PALs, an embodiment of the present invention was compared to two state-of-the-art PALs. Measurements of the lenses were taken from a Visionix VM-2500™ lens mapper, trademarked by Visionix. One of the state-of-the-art PALs is a Varilux Physio™ lens, trademarked by Varilux, having approximately +2.00 D add power. The other state-of-the-art PAL is a Varilux Ellipse™ lens, trademarked by Varilux, which has a short channel design and approximately +2.00 D add power. As can be seen in Table I, the Physio lens has a maximum unwanted astigmatism of 1.68 D, a channel width of 10.5 mm and a channel length of 17.0 mm. The Ellipse lens has a maximum unwanted astigmatism of 2.00 D, a channel width of 8.5 mm and a channel length of 13.5 mm. The inventive lens also has an add power of approximately +2.00. However, in comparison, the inventive less has a maximum unwanted astigmatism of less than 1.00 D. Because the maximum unwanted astigmatism is below 1.00 D, the channel width is for all intents and purposes as wide as the lens itself. Lastly, the channel length is 14.5 mm. It should also be pointed out, that neither the Visionix VM-2500™ lens mapper nor the Rotlex Class Plus™ lens mapper were able to detect unwanted astigmatism at the discontinuity in the inventive lens due to its small width.

TABLE 1

| ATTRIBUTE | VARILUX ELLIPSE (2.00 D ADD) | VARILUX PHYSIO (2.00 D ADD) | INVENTION EMBODIMENT (1D SPH LENS + 1 D ADD PHYSIO) |
|---|---|---|---|
| DISTANCE POWER | 0.12 D | .08 D | −0.11 D |
| NEAR TOTAL POWER | 2.11 D | 2.17 D | 1.90 D |
| TOTAL ADD POWER | 1.99 D | 2.11 D | 2.02 D |
| CHANNEL LENGTH | 13.5 MM | 17.0 MM | 14.5 MM |
| CHANNEL WIDTH | 8.5 MM | 10.5 MM | 23.5 MM |
| MAX UNWANTED ASTIGMATISM (BELOW THE MIDLINE) | 2.05 D | 1.68 D | 0.90 D |
| MAX UNWANTED ASTIGMATISM (ABOVE THE MIDLINE) | 0.98 D | 0.95 D | 0.5 D |

What is claimed is:

1. An ophthalmic lens having a fitting point, comprising:
   a far distance zone;
   a mostly spherical power region for providing additive optical power to the far distance zone for providing an intermediate distance zone of the lens;
   a discontinuity, as viewed through the lens, located between the far distance zone and said mostly spherical power region;
   a progressive optical power region that overlaps as viewed through the lens at least a portion of said mostly spherical power region for providing additive optical power to said mostly spherical power region for providing a near distance zone of the lens, and
   a plateau of optical power located in a portion of said progressive optical power region for providing vertical stability of vision in said intermediate distance zone;
   wherein said plateau of optical power has a vertical length of approximately 1 millimeter to 6 millimeters.

2. The ophthalmic lens of claim 1, wherein said plateau of optical power has a vertical length of approximately 1 millimeter to 3 millimeters.

3. The ophthalmic lens of claim 1, wherein said plateau of optical power has a vertical length of approximately 2 millimeter to 6 millimeters.

4. The ophthalmic lens of claim 1, further comprising: a blend zone for blending the optical power across at least a portion of said discontinuity.

5. The ophthalmic lens of claim 4, wherein at least a portion of said blend zone has a width of approximately 2.0 millimeters or less.

6. The ophthalmic lens of claim 1, wherein at least a portion of said mostly spherical power region and said progressive optical power region are mathematically combined to form a surface of the lens.

7. The ophthalmic lens of claim 1, wherein said intermediate distance zone has an add power that is between approximately 45% and approximately 55% of the near distance add power of the lens.

8. The ophthalmic lens of claim 1, wherein the top edge of said mostly spherical power region is located between approximately 3 millimeters and approximately 4 millimeters below the fitting point, and wherein said progressive optical power region starts between approximately 4 millimeters and approximately 8 millimeters from the top edge of said mostly spherical power region.

9. The ophthalmic lens of claim 1, wherein said discontinuity is caused by a step in optical power.

10. The ophthalmic lens of claim 9, wherein said step in optical power is a step up in optical power of at least approximately +0.12 D.

11. The ophthalmic lens of claim 1, wherein said mostly spherical power region is located on a surface of the lens or buried within the lens.

12. The ophthalmic lens of claim 1, wherein said progressive optical power region is located on a surface of the lens or buried within the lens.

13. The ophthalmic lens of claim 1, wherein said progressive optical power region comprises a progressive optical power surface, and wherein said progressive optical power surface is generated by one of free-forming, molding, or surface casting.

14. The ophthalmic lens of claim 1, wherein said mostly spherical power region is generated by one of free forming a surface of the lens, molding a surface of the lens, or burying a surface within the lens.

15. An ophthalmic lens having a fitting point, comprising:
    a far distance zone;
    a mostly spherical power region for providing additive optical power to the far distance zone for providing an upper far-intermediate distance zone of the lens;
    a discontinuity, as viewed through the lens, located between the far distance zone and said mostly spherical power region;
    a progressive optical power region that overlaps as viewed through the lens at least a portion of said mostly spherical power region for providing additive optical power to said mostly spherical power region for providing an intermediate distance zone of the lens and a near distance zone of the lens; and
    a plateau of optical power located in a portion of said progressive optical power region for providing vertical stability of vision in said upper far-intermediate distance zone, wherein said plateau of optical power has a vertical length of approximately 1 millimeter to 6 millimeters.

16. The ophthalmic lens of claim 15, wherein said plateau of optical power has a vertical length of approximately 1 millimeter to 3 millimeters.

17. The ophthalmic lens of claim 15, wherein said plateau of optical power has a vertical length of approximately 2 millimeter to 6 millimeters.

18. The ophthalmic lens of claim 15, further comprising:
    a blend zone for blending the optical power across at least a portion of said discontinuity.

19. The ophthalmic lens of claim 18, wherein at least a portion of said blend zone has a width of approximately 2.0 millimeters or less.

20. The ophthalmic lens of claim 15, wherein at least a portion of said mostly spherical power region and said progressive optical power region are mathematically combined to form a surface of the lens.

21. The ophthalmic lens of claim 15, wherein the top edge of said mostly spherical power region is located between approximately 2 millimeters and approximately 5 millimeters below the fitting point, and wherein said progressive optical power region starts between approximately 4 millimeters and approximately 8 millimeters from the top edge of said mostly spherical power region.

22. The ophthalmic lens of claim 21, wherein said upper far-intermediate distance zone has an add power that is between approximately 20% and approximately 44% of the near distance add power of the lens.

23. The ophthalmic lens of claim 15, wherein said discontinuity is caused by a step in optical power.

24. The ophthalmic lens of claim 23, wherein said step in optical power is a step up in optical power of at least approximately +0.12 D.

25. The ophthalmic lens of claim 15, wherein said mostly spherical power region is located on a surface of the lens or buried within the lens.

26. The ophthalmic lens of claim 15, wherein said progressive optical power region is located on a surface of the lens or buried within the lens.

27. The ophthalmic lens of claim 15, wherein the optical power contributed by the progressive optical power region decreases after the near distance zone for providing a lower far-intermediate zone.

28. The ophthalmic lens of claim 15, wherein said progressive optical power region comprises a progressive optical power surface, and wherein said progressive optical power surface is generated by one of free-forming, molding, or surface casting.

29. The ophthalmic lens of claim 15, wherein said mostly spherical power region is generated by one of free forming a surface of the lens, molding a surface of the lens, or burying a surface within the lens.

30. An ophthalmic lens having a fitting point, comprising:
a far distance zone;
a mostly spherical power region for providing additive optical power to the far distance zone;
a discontinuity, as viewed through the lens, located between the far distance zone and said mostly spherical power region;
a progressive optical power region that overlaps as viewed through the lens at least a portion of said mostly spherical power region for providing additive optical power to said mostly spherical power region for providing an intermediate distance zone of the lens and a near distance zone of the lens; and
a plateau of optical power located in a portion of said progressive optical power region for providing vertical stability of vision in a zone of the lens, wherein said plateau of optical power has a vertical length of approximately 1 millimeter to 6 millimeters.

31. The ophthalmic lens of claim 30, wherein said plateau of optical power has a vertical length of approximately 1 millimeter to 3 millimeters.

32. The ophthalmic lens of claim 30, wherein said plateau of optical power has a vertical length of approximately 2 millimeter to 6 millimeters.

33. The ophthalmic lens of claim 30, wherein said additive optical power of said progressive optical power region also provides an upper far-intermediate distance zone of the lens.

34. The ophthalmic lens of claim 30, wherein said plateau provides for vertical stability of vision in said intermediate distance zone.

35. The ophthalmic lens of claim 33, wherein said plateau provides for vertical stability of vision in said upper far-intermediate distance zone.

36. The ophthalmic lens of claim 30, further comprising:
a blend zone for blending the optical power across at least a portion of said discontinuity.

37. The ophthalmic lens of claim 36, wherein at least a portion of said blend zone has a width of approximately 2.0 millimeters or less.

38. The ophthalmic lens of claim 30, wherein at least a portion of said mostly spherical power region and said progressive optical power region are mathematically combined to form a surface of the lens.

39. The ophthalmic lens of claim 30, wherein said intermediate distance zone has an add power that is between approximately 45% and approximately 55% of the near distance add power of the lens.

40. The ophthalmic lens of claim 30, wherein said discontinuity is caused by a step in optical power.

41. The ophthalmic lens of claim 40, wherein said step in optical power is a step up in optical power of at least approximately +0.12 D.

42. The ophthalmic lens of claim 30, wherein said mostly spherical power region is located on a surface of the lens or buried within the lens.

43. The ophthalmic lens of claim 30, wherein said progressive optical power region is located on a surface of the lens or buried within the lens.

44. The ophthalmic lens of claim 30, wherein the optical power contributed by the progressive optical power region decreases after the near distance zone for providing a lower far-intermediate zone.

45. The ophthalmic lens of claim 30, wherein said progressive optical power region comprises a progressive optical power surface, and wherein said progressive optical power surface is generated by one of free-forming, molding, or surface casting.

46. The ophthalmic lens of claim 30, wherein said mostly spherical power region is generated by one of free forming a surface of the lens, molding a surface of the lens, or burying a surface within the lens.

47. An ophthalmic lens, comprising:
a far distance zone, an intermediate distance zone, and a near distance zone;
a mostly spherical power region for providing additive optical power to the far distance zone;
a discontinuity, as viewed through the lens, located between the far distance zone and said mostly spherical power region;
a progressive optical power region that overlaps as viewed through the lens at least a portion of said mostly spherical power region, wherein a portion of said progressive optical power region contributes a negative optical power to said mostly spherical power region; and
a plateau of optical power located in a portion of the progressive optical power region for providing vertical stability of vision in said intermediate distance zone, wherein said plateau of optical power has a vertical length of approximately 1 millimeter to 6 millimeters.

48. The ophthalmic lens of claim 47, wherein said plateau of optical power has a vertical length of approximately 1 millimeter to 3 millimeters.

49. The ophthalmic lens of claim 47, wherein said plateau of optical power has a vertical length of approximately 2 millimeter to 6 millimeters.

50. An ophthalmic lens, comprising:
a far distance zone, an upper far-intermediate distance zone, an intermediate distance zone, and a near distance zone;
a mostly spherical power region for providing additive optical power to the far distance zone;
a discontinuity, as viewed through the lens, located between the far distance zone and said mostly spherical power region;
a progressive optical power region that overlaps as viewed through the lens at least a portion of said mostly spherical power region, wherein a portion of said progressive optical power region contributes a negative optical power to said mostly spherical power region; and
a plateau of optical power located in a portion of the progressive optical power region for providing vertical stability of vision in an upper far-intermediate distance zone of the lens, wherein said plateau of optical power has a vertical length of approximately 1 millimeter to 6 millimeters.

51. The ophthalmic lens of claim 50, wherein said plateau of optical power has a vertical length of approximately 1 millimeter to 3 millimeters.

52. The ophthalmic lens of claim 50, wherein said plateau of optical power has a vertical length of approximately 2 millimeter to 6 millimeters.

53. The ophthalmic lens of claim 47, further comprising:
a blend zone for blending the optical power across at least a portion of said discontinuity.

54. The ophthalmic lens of claim 53, wherein at least a portion of said blend zone has a width of approximately 2.0 millimeters or less.

55. The ophthalmic lens of claim 47, wherein at least a portion of said mostly spherical power region and said progressive optical power region are mathematically combined to form a surface of the lens.

56. The ophthalmic lens of claim 47, wherein said intermediate distance zone has an add power that is between approximately 45% and approximately 55% of the near distance add power of the lens.

57. The ophthalmic lens of claim 47, wherein said discontinuity is caused by a step in optical power.

58. The ophthalmic lens of claim 57, wherein said step in optical power is a step up in optical power of at least approximately +0.12 D.

59. The ophthalmic lens of claim 47, wherein said mostly spherical power region is located on a surface of the lens or buried within the lens.

60. The ophthalmic lens of claim 47, wherein said progressive optical power region is located on a surface of the lens or buried within the lens.

61. The ophthalmic lens of claim 47, wherein the optical power contributed by the progressive optical power region decreases after the near distance zone for providing a lower far-intermediate zone.

62. The ophthalmic lens of claim 47, wherein said progressive optical power region comprises a progressive optical power surface, and wherein said progressive optical power surface is generated by one of free-forming, molding, or surface casting.

63. The ophthalmic lens of claim 47, wherein said mostly spherical power region is generated by one of free forming a surface of the lens, molding a surface of the lens, or burying a surface within the lens.

64. An ophthalmic lens, comprising:
a far distance zone, an upper far-intermediate distance zone, an intermediate distance zone, and a near distance zone;
a progressive optical power region; and
a first plateau of optical power located in a portion of said progressive optical power region for providing vertical stability of vision in the upper far-intermediate distance zone, wherein said first plateau of optical power has a vertical length of approximately 1 millimeter to 6 millimeters.

65. The ophthalmic lens of claim 64, wherein said first plateau of optical power has a vertical length of approximately 1 millimeter to 3 millimeters.

66. The ophthalmic lens of claim 64, wherein said first plateau of optical power has a vertical length of approximately 2 millimeters to 6 millimeters.

67. The ophthalmic lens of claim 64, further comprising:
a second plateau of optical power located in a portion of the progressive optical power region for providing vertical stability of vision in the intermediate distance zone.

68. The ophthalmic lens of claim 67, wherein said second plateau of optical power has a vertical length of approximately 1 millimeter to 3 millimeters.

69. The ophthalmic lens of claim 67, wherein said second plateau of optical power has a vertical length of approximately 2 millimeter to 6 millimeters.

70. The ophthalmic lens of claim 67, further comprising:
a third plateau of optical power located in a portion of the progressive optical power region for providing vertical stability of vision in the near distance zone.

71. The ophthalmic lens of claim 70, wherein said third plateau of optical power has a vertical length of approximately 1 millimeter to 3 millimeters.

72. The ophthalmic lens of claim 70, wherein said third plateau of optical power has a vertical length of approximately 2 millimeter to 6 millimeters.

73. The ophthalmic lens of claim 64, wherein the optical power contributed by the progressive optical power region decreases after the near distance zone for providing a lower far-intermediate zone.

74. The ophthalmic lens of claim 64, wherein the lens is a Progressive Addition Lens.

75. The ophthalmic lens of claim 64, further comprising an aspheric power region.

76. An ophthalmic lens, comprising:
a far distance zone, an intermediate distance zone, and a near distance zone;
a mostly spherical power region for providing additive optical power to the far distance zone;
a discontinuity as viewed through the lens between the far distance zone and said mostly spherical power region;
a progressive optical power region that overlaps as viewed through the lens at least a portion of said mostly spherical power region spaced apart from and below said discontinuity for providing additive optical power to said mostly spherical power region; and
a plateau of optical power located in a portion of the progressive optical power region for providing vertical stability of vision in the intermediate distance zone, wherein said plateau of optical power has a vertical length of approximately 1 millimeter to 6 millimeters.

77. The ophthalmic lens of claim 76, wherein said plateau of optical power has a vertical length of approximately 1 millimeter to 3 millimeters.

78. The ophthalmic lens of claim 76, wherein said plateau of optical power has a vertical length of approximately 2 millimeter to 6 millimeters.

79. The ophthalmic lens of claim 50, further comprising:
a blend zone for blending the optical power across at least a portion of said discontinuity.

80. The ophthalmic lens of claim 79, wherein at least a portion of said blend zone has a width of approximately 2.0 millimeters or less.

81. The ophthalmic lens of claim 50, wherein at least a portion of said mostly spherical power region and said progressive optical power region are mathematically combined to form a surface of the lens.

82. The ophthalmic lens of claim 50, wherein said intermediate distance zone has an add power that is between approximately 45% and approximately 55% of the near distance add power of the lens.

83. The ophthalmic lens of claim 50, wherein said discontinuity is caused by a step in optical power.

84. The ophthalmic lens of claim 83, wherein said step in optical power is a step up in optical power of at least approximately +0.12 D.

85. The ophthalmic lens of claim 50, wherein said mostly spherical power region is located on a surface of the lens or buried within the lens.

86. The ophthalmic lens of claim 50, wherein said progressive optical power region is located on a surface of the lens or buried within the lens.

87. The ophthalmic lens of claim 50, wherein the optical power contributed by the progressive optical power region decreases after the near distance zone for providing a lower far-intermediate zone.

88. The ophthalmic lens of claim 50, wherein said progressive optical power region comprises a progressive optical power surface, and wherein said progressive optical power surface is generated by one of free-forming, molding, or surface casting.

89. The ophthalmic lens of claim 50, wherein said mostly spherical power region is generated by one of free forming a surface of the lens, molding a surface of the lens, or burying a surface within the lens.

* * * * *